(12) United States Patent
Hashiro et al.

(10) Patent No.: US 12,514,253 B2
(45) Date of Patent: Jan. 6, 2026

(54) METHOD FOR INDUCING RNA SILENCING

(71) Applicant: AJINOMOTO CO., INC., Tokyo (JP)

(72) Inventors: Shuhei Hashiro, Kanagawa (JP); Hisashi Yasueda, Kanagawa (JP); Mayu Nakano, Kanagawa (JP); Teruyuki Niimi, Aichi (JP); Haruka Kawaguchi, Aichi (JP)

(73) Assignee: AJINOMOTO CO., INC., Tokyo (JP)

( * ) Notice: Subject to any disclaimer, the term of this patent is extended or adjusted under 35 U.S.C. 154(b) by 1243 days.

(21) Appl. No.: 16/993,692

(22) Filed: Aug. 14, 2020

(65) Prior Publication Data

US 2021/0024931 A1  Jan. 28, 2021

Related U.S. Application Data

(63) Continuation of application No. PCT/JP2019/006324, filed on Feb. 20, 2019.

(30) Foreign Application Priority Data

Feb. 20, 2018  (JP) .................. 2018-028262

(51) Int. Cl.
| | |
|---|---|
| *A01N 63/60* | (2020.01) |
| *C12N 9/22* | (2006.01) |
| *C12N 15/113* | (2010.01) |
| *C12N 15/70* | (2006.01) |
| *C12N 15/77* | (2006.01) |

(52) U.S. Cl.
CPC .............. *A01N 63/60* (2020.01); *C12N 9/22* (2013.01); *C12N 15/113* (2013.01); *C12N 15/70* (2013.01); *C12N 15/77* (2013.01)

(58) Field of Classification Search
CPC .......... A01N 63/60; A01N 57/16; C12N 9/22; C12N 15/113; C12N 15/70; C12N 15/77; A01P 7/04
See application file for complete search history.

(56) References Cited

U.S. PATENT DOCUMENTS

| | | |
|---|---|---|
| 9,445,603 B2 | 9/2016 | Baum et al. |
| 2012/0151631 A1 | 6/2012 | Niimi et al. |
| 2013/0011372 A1 | 1/2013 | Tortora et al. |

(Continued)

FOREIGN PATENT DOCUMENTS

| | | |
|---|---|---|
| JP | 2016-517274 A | 6/2016 |
| WO | WO2010/140675 A1 | 12/2010 |

(Continued)

OTHER PUBLICATIONS

Price et al., RNAi-mediated crop protection against insects. Trends Biotechnol 26:393-400 (2008).*

(Continued)

*Primary Examiner* — Tracy Vivlemore
*Assistant Examiner* — Thomas R. Amick
(74) *Attorney, Agent, or Firm* — Cermak & McGowan LLP; Shelly Guest Cermak

(57) ABSTRACT

A method for efficiently inducing RNA silencing in a target organism is provided. RNA silencing is induced in a target organism by allowing the target organism to ingest cells of a microorganism, wherein the microorganism is able to produce RNA that induces RNA silencing after treating the cells with an organic solvent.

8 Claims, 7 Drawing Sheets

Specification includes a Sequence Listing.

(56) References Cited

U.S. PATENT DOCUMENTS

| | | |
|---|---|---|
| 2014/0271559 A1 | 9/2014 | Baum et al. |
| 2016/0145630 A1 | 5/2016 | Baum et al. |
| 2017/0035056 A1 | 2/2017 | Baum et al. |
| 2018/0092364 A1 | 4/2018 | Baum et al. |
| 2019/0000089 A1 | 1/2019 | Baum et al. |

FOREIGN PATENT DOCUMENTS

| | | |
|---|---|---|
| WO | WO2017/112538 A2 | 6/2017 |
| WO | WO2017/112538 A3 | 6/2017 |

OTHER PUBLICATIONS

Center for Disease Control and Prevention; nfection Control Chemical Disinfectants Guideline for Disinfection and Sterilization in Healthcare Facilities (2008) pp. 1-14; dowloaded Apr. 13, 2024.*

Tenllado et al., Crude extracts of bacterially expressed dsRNA can be used to protect plants against virus infections BMC Biotechnology 2003 pp. 1-11.*

El-Ashram S, Al Nasr I, Suo X. Nucleic acid protocols: Extraction and optimization. Biotechnol Rep (Amst). Oct. 5, 2016;12:33-39 (Year: 2016).*

Canada PSDS (Pathogen Safety Data Sheets: Infectious Substances—Corynebacterium diphtheriae, Date modified: Apr. 30, 2012, https://www.canada.ca/en/public-health/services/laboratory-biosafety-biosecurity/pathogen-safety-data-sheets-risk-assessment/corynebacterium-diphtheriae.html, pdf attached.). (Year: 2012).*

Nwokeoji (Nwokeoji, Alison O., et al. "Purification and characterisation of dsRNA using ion pair reverse phase chromatography and mass spectrometry." Journal of Chromatography A 1484 (2017): 14-25.) (Year: 2017).*

Sanitt, P., et al., "Protection of yellow head virus infection in shrimp by feeding of bacteria expressing dsRNAs," J. Biotechnol. 2014;179:26-31.

Zhu, F., et al., "Ingested RNA interference for managing the populations of the Colorado potato beetle, *Leptinotarsa decemlineata*," Pest Manag. Sci. 2011;67:175-182.

International Search Report for PCT Patent App. No. PCT/JP2019/006324 (May 14, 2019).

Extended European Search Report for European Patent App. No. 19757971.7 (Oct. 21, 2021).

* cited by examiner

```
SEQUENCE LISTING

<160> NUMBER OF SEQ ID NOS: 41

<210> SEQ ID NO 1
<211> LENGTH: 35
<212> TYPE: DNA
<213> ORGANISM: Artificial Sequence
<220> FEATURE:
<223> OTHER INFORMATION: primer

<400> SEQUENCE: 1
aaaacgacgg ccagtggctg aatctgagcg cctgg                              35

<210> SEQ ID NO 2
<211> LENGTH: 35
<212> TYPE: DNA
<213> ORGANISM: Artificial Sequence
<220> FEATURE:
<223> OTHER INFORMATION: primer

<400> SEQUENCE: 2
tcaacttcag gcagtaggaa cttctccaaa ccagc                              35

<210> SEQ ID NO 3
<211> LENGTH: 22
<212> TYPE: DNA
```

```
<213> ORGANISM: Artificial Sequence
<220> FEATURE:
<223> OTHER INFORMATION: primer

<400> SEQUENCE: 3
actgcctgaa gttgaggtgg tg                                              22

<210> SEQ ID NO 4
<211> LENGTH: 35
<212> TYPE: DNA
<213> ORGANISM: Artificial Sequence
<220> FEATURE:
<223> OTHER INFORMATION: primer

<400> SEQUENCE: 4
gaccatgatt acgccaagaa aatcgacact gtcag                                35

<210> SEQ ID NO 5
<211> LENGTH: 26
<212> TYPE: DNA
<213> ORGANISM: Artificial Sequence
<220> FEATURE:
<223> OTHER INFORMATION: primer

<400> SEQUENCE: 5
ggcgtaatca tggtcatagc tgtttc                                          26

<210> SEQ ID NO 6
<211> LENGTH: 24
<212> TYPE: DNA
<213> ORGANISM: Artificial Sequence
<220> FEATURE:
<223> OTHER INFORMATION: primer

<400> SEQUENCE: 6
actggccgtc gttttacaac gtcg                                            24

<210> SEQ ID NO 7
<211> LENGTH: 22
<212> TYPE: DNA
<213> ORGANISM: Artificial Sequence
<220> FEATURE:
<223> OTHER INFORMATION: primer

<400> SEQUENCE: 7
ggctgaatct gagcgcctgg tc                                              22

<210> SEQ ID NO 8
<211> LENGTH: 24
<212> TYPE: DNA
<213> ORGANISM: Artificial Sequence
<220> FEATURE:
<223> OTHER INFORMATION: primer

<400> SEQUENCE: 8
aagaaaatcg acactgtcag ccag                                            24

<210> SEQ ID NO 9
<211> LENGTH: 38
<212> TYPE: DNA
<213> ORGANISM: Artificial Sequence
<220> FEATURE:
<223> OTHER INFORMATION: primer

<400> SEQUENCE: 9
gacgttgatc ggcacgacga tcctttttaa cccatcac                             38
```

<210> SEQ ID NO 10
<211> LENGTH: 39
<212> TYPE: DNA
<213> ORGANISM: Artificial Sequence
<220> FEATURE:
<223> OTHER INFORMATION: primer

<400> SEQUENCE: 10
agacgtagac aagctcatat gggattcacc tttatgttg                    39

<210> SEQ ID NO 11
<211> LENGTH: 24
<212> TYPE: DNA
<213> ORGANISM: Artificial Sequence
<220> FEATURE:
<223> OTHER INFORMATION: primer

<400> SEQUENCE: 11
agcttgtcta cgtctgatgc tttg                                    24

<210> SEQ ID NO 12
<211> LENGTH: 23
<212> TYPE: DNA
<213> ORGANISM: Artificial Sequence
<220> FEATURE:
<223> OTHER INFORMATION: primer

<400> SEQUENCE: 12
gtgccgatca acgtctcatt ttc                                     23

<210> SEQ ID NO 13
<211> LENGTH: 25
<212> TYPE: DNA
<213> ORGANISM: Artificial Sequence
<220> FEATURE:
<223> OTHER INFORMATION: primer

<400> SEQUENCE: 13
gtagctcgca cgggggtttg tcttg                                   25

<210> SEQ ID NO 14
<211> LENGTH: 28
<212> TYPE: DNA
<213> ORGANISM: Artificial Sequence
<220> FEATURE:
<223> OTHER INFORMATION: primer

<400> SEQUENCE: 14
gaactcatat gcacgggggc cacataac                                28

<210> SEQ ID NO 15
<211> LENGTH: 346
<212> TYPE: DNA
<213> ORGANISM: Henosepilachna vigintioctopunctata

<400> SEQUENCE: 15
cctcggaatc ggcgaccaga cgttgtgctt ctactgcggc ggcggtctga aagattgggt     60
cgaagaagac gatccgtggg aacagcacgc gctttggttc ccccagtgta attatctatt    120
attgaagaaa acacccgctt tcgtcaaaga cgtccaagaa aaacataaag gcgatttgtc    180
gtcatccaag caaaacgaga ccgaagtggt agcaagtagt agcagtagtc acaactccaa    240
agaatctcca agtgcggtgg tagaagagcg agaaagaaac aacgcagagg aaagctcgac    300

```
attatgcaaa atatgttata aaaatgaatt ggctgttgta tttcta            346
```

<210> SEQ ID NO 16
<211> LENGTH: 259
<212> TYPE: DNA
<213> ORGANISM: Artificial Sequence
<220> FEATURE:
<223> OTHER INFORMATION: DNA fragment containing F1 promoter

<400> SEQUENCE: 16

```
gatctactcg ttactcaagg caaggtcgag cgggacggtc gaaccagctt caagcgaccg    60
gatgagtatg ttacagtaga tagcgagcgg gagaccgctc gaccttagtt ctcctgttgc   120
gggggagttc atgggatcca cgtaccctgc gagacaggag taatcctaaa cagggcattg   180
cactccgccc ttgctagcat agcataaaat aacgccccac cttcttaacg ggaggtgggg   240
cgttattttt acggggatc                                                259
```

<210> SEQ ID NO 17
<211> LENGTH: 139
<212> TYPE: DNA
<213> ORGANISM: Bacteriophage BFK20

<400> SEQUENCE: 17

```
gatctactcg ttactcaagg caaggtcgag cgggacggtc gaaccagctt caagcgaccg    60
gatgagtatg ttacagtaga tagcgagcgg gagaccgctc gaccttagtt ctcctgttgc   120
gggggagttc atgggatcc                                                139
```

<210> SEQ ID NO 18
<211> LENGTH: 20
<212> TYPE: DNA
<213> ORGANISM: Artificial Sequence
<220> FEATURE:
<223> OTHER INFORMATION: primer

<400> SEQUENCE: 18

```
agcctggggt gcctaatgag                                                20
```

<210> SEQ ID NO 19
<211> LENGTH: 36
<212> TYPE: DNA
<213> ORGANISM: Artificial Sequence
<220> FEATURE:
<223> OTHER INFORMATION: primer

<400> SEQUENCE: 19

```
gctgttgtat ttctaaaggc caggaaccgt aaaaag                              36
```

<210> SEQ ID NO 20
<211> LENGTH: 36
<212> TYPE: DNA
<213> ORGANISM: Artificial Sequence
<220> FEATURE:
<223> OTHER INFORMATION: primer

<400> SEQUENCE: 20

```
taggcacccc aggctgatct actcgttact caaggc                              36
```

<210> SEQ ID NO 21
<211> LENGTH: 23
<212> TYPE: DNA
<213> ORGANISM: Artificial Sequence
<220> FEATURE:
<223> OTHER INFORMATION: primer

```
<400> SEQUENCE: 21
tcgctatcta ctgtaacata ctc                                          23

<210> SEQ ID NO 22
<211> LENGTH: 34
<212> TYPE: DNA
<213> ORGANISM: Artificial Sequence
<220> FEATURE:
<223> OTHER INFORMATION: primer

<400> SEQUENCE: 22
tacagtagat agcgacctcg gaatcggcga ccag                              34

<210> SEQ ID NO 23
<211> LENGTH: 21
<212> TYPE: DNA
<213> ORGANISM: Artificial Sequence
<220> FEATURE:
<223> OTHER INFORMATION: primer

<400> SEQUENCE: 23
tagaaataca acagccaatt c                                            21

<210> SEQ ID NO 24
<211> LENGTH: 21
<212> TYPE: DNA
<213> ORGANISM: Artificial Sequence
<220> FEATURE:
<223> OTHER INFORMATION: primer

<400> SEQUENCE: 24
aaggccagga accgtaaaaa g                                            21

<210> SEQ ID NO 25
<211> LENGTH: 36
<212> TYPE: DNA
<213> ORGANISM: Artificial Sequence
<220> FEATURE:
<223> OTHER INFORMATION: primer

<400> SEQUENCE: 25
acggttcctg gccttgatct actcgttact caaggc                            36

<210> SEQ ID NO 26
<211> LENGTH: 38
<212> TYPE: DNA
<213> ORGANISM: Artificial Sequence
<220> FEATURE:
<223> OTHER INFORMATION: primer

<400> SEQUENCE: 26
taggcacccc aggcttcgct atctactgta acatactc                          38

<210> SEQ ID NO 27
<211> LENGTH: 42
<212> TYPE: DNA
<213> ORGANISM: Artificial Sequence
<220> FEATURE:
<223> OTHER INFORMATION: primer

<400> SEQUENCE: 27
ggtaccggat cccctcgagt cgctatctac tgtaacatac tc                     42

<210> SEQ ID NO 28
```

<210> SEQ ID NO 28
<211> LENGTH: 30
<212> TYPE: DNA
<213> ORGANISM: Artificial Sequence
<220> FEATURE:
<223> OTHER INFORMATION: primer

<400> SEQUENCE: 28
ccaggtaccg atctactcgt tactcaaggc                                    30

<210> SEQ ID NO 29
<211> LENGTH: 31
<212> TYPE: DNA
<213> ORGANISM: Artificial Sequence
<220> FEATURE:
<223> OTHER INFORMATION: primer

<400> SEQUENCE: 29
cgaactcgag tagaaataca acagccaatt c                                  31

<210> SEQ ID NO 30
<211> LENGTH: 744
<212> TYPE: DNA
<213> ORGANISM: Corynebacterium glutamicum

<400> SEQUENCE: 30
gtgagcagga aaagaatcg cctcaccggg gtagacgcac tcaatgaagc attcgatgca     60
gtagatcatc agccgctgct tgaccacctt ggtgtggaca tccagcgcga tctgttggtg   120
cttgcgttga ctcaccgctc tttcgccaac gaaaacggca tgctgcccaa taatgagcgc   180
ttggagttcc tcggcgacgc cgtcttgggt ctctccgtgg ccaacaagct ctatgagcag   240
taccccagca gccctgaatc tgatgtctcc aagatgcgcg cttcaattgt cagccgttac   300
ggcctggcag atatcgctcg cgaaattgat cttggcaacc acatattgct gggcaaaggc   360
gaattgctca ccgaaggtcg cagtaaggat tccattcttg cggacaccac agaggcgtta   420
ttcggcgcga ttttccgcca gcacggtttt gaaaccgccc gcgacgtaat tttgcgcctg   480
tttgcctaca agatcgataa cgcatcggcc aggggcattc accaggactg aagaccacg   540
ctgcaggagg aacttgccca gcgcaagcgc cccatggctg aatattccgc cacctcagtc   600
ggtccggatc acgatctagt gttcaccgcc atcgtgacgc tggaaggtga agaaatgggt   660
cggggagaag gcccgaacaa gaagctggcc gagcaggaag cagcgcacca ggcattccga   720
aagcttcggg agtcccgtgc ctga                                         744

<210> SEQ ID NO 31
<211> LENGTH: 247
<212> TYPE: PRT
<213> ORGANISM: Corynebacterium glutamicum

<400> SEQUENCE: 31

Met Ser Arg Lys Lys Asn Arg Leu Thr Gly Val Asp Ala Leu Asn Glu
1               5                   10                  15

Ala Phe Asp Ala Val Asp His Gln Pro Leu Leu Asp His Leu Gly Val
            20                  25                  30

Asp Ile Gln Arg Asp Leu Leu Val Leu Ala Leu Thr His Arg Ser Phe
        35                  40                  45

Ala Asn Glu Asn Gly Met Leu Pro Asn Asn Glu Arg Leu Glu Phe Leu
    50                  55                  60

Gly Asp Ala Val Leu Gly Leu Ser Val Ala Asn Lys Leu Tyr Glu Gln
65                  70                  75                  80

```
Tyr Pro Ser Ser Pro Glu Ser Asp Val Ser Lys Met Arg Ala Ser Ile
                85                  90                  95

Val Ser Arg Tyr Gly Leu Ala Asp Ile Ala Arg Glu Ile Asp Leu Gly
            100                 105                 110

Asn His Ile Leu Leu Gly Lys Gly Glu Leu Leu Thr Glu Gly Arg Ser
            115                 120                 125

Lys Asp Ser Ile Leu Ala Asp Thr Thr Glu Ala Leu Phe Gly Ala Ile
    130                 135                 140

Phe Arg Gln His Gly Phe Glu Thr Ala Arg Asp Val Ile Leu Arg Leu
145                 150                 155                 160

Phe Ala Tyr Lys Ile Asp Asn Ala Ser Ala Arg Gly Ile His Gln Asp
                165                 170                 175

Trp Lys Thr Thr Leu Gln Glu Glu Leu Ala Gln Arg Lys Arg Pro Met
            180                 185                 190

Ala Glu Tyr Ser Ala Thr Ser Val Gly Pro Asp His Asp Leu Val Phe
            195                 200                 205

Thr Ala Ile Val Thr Leu Glu Gly Glu Met Gly Arg Gly Glu Gly
    210                 215                 220

Pro Asn Lys Lys Leu Ala Glu Gln Glu Ala Ala His Gln Ala Phe Arg
225                 230                 235                 240

Lys Leu Arg Glu Ser Arg Ala
            245
```

```
<210> SEQ ID NO 32
<211> LENGTH: 21
<212> TYPE: DNA
<213> ORGANISM: Artificial Sequence
<220> FEATURE:
<223> OTHER INFORMATION: primer

<400> SEQUENCE: 32
aaggccagga accgtaaaaa g                                            21

<210> SEQ ID NO 33
<211> LENGTH: 20
<212> TYPE: DNA
<213> ORGANISM: Artificial Sequence
<220> FEATURE:
<223> OTHER INFORMATION: primer

<400> SEQUENCE: 33
agcctggggt gcctaatgag                                              20

<210> SEQ ID NO 34
<211> LENGTH: 87
<212> TYPE: DNA
<213> ORGANISM: Artificial Sequence
<220> FEATURE:
<223> OTHER INFORMATION: primer

<400> SEQUENCE: 34
taggcacccc aggcttaata cgactcacta gggggtacc ggatcccctc gagcctatag   60
tgagtcgtat taaaggccag gaaccgt                                      87

<210> SEQ ID NO 35
<211> LENGTH: 87
<212> TYPE: DNA
<213> ORGANISM: Artificial Sequence
<220> FEATURE:
<223> OTHER INFORMATION: primer
```

```
<400> SEQUENCE: 35
acggttcctg gcctttaata cgactcacta taggctcgag gggatccggt accccctatag    60 tgagtcgtat taagcctggg gtgccta                                         87

<210> SEQ ID NO 36
<211> LENGTH: 28
<212> TYPE: DNA
<213> ORGANISM: Artificial Sequence
<220> FEATURE:
<223> OTHER INFORMATION: primer

<400> SEQUENCE: 36
cttggtaccc ctcggaatcg gcgaccag                                        28

<210> SEQ ID NO 37
<211> LENGTH: 30
<212> TYPE: DNA
<213> ORGANISM: Artificial Sequence
<220> FEATURE:
<223> OTHER INFORMATION: primer

<400> SEQUENCE: 37
gttctcgagt agaaatacaa cagccaattc                                      30

<210> SEQ ID NO 38
<211> LENGTH: 20
<212> TYPE: DNA
<213> ORGANISM: Artificial Sequence
<220> FEATURE:
<223> OTHER INFORMATION: primer

<400> SEQUENCE: 38
ctcactggcc gtcgttttac                                                 20

<210> SEQ ID NO 39
<211> LENGTH: 24
<212> TYPE: DNA
<213> ORGANISM: Artificial Sequence
<220> FEATURE:
<223> OTHER INFORMATION: primer

<400> SEQUENCE: 39
atttcgataa gccaggttgc ttcc                                            24

<210> SEQ ID NO 40
<211> LENGTH: 36
<212> TYPE: DNA
<213> ORGANISM: Artificial Sequence
<220> FEATURE:
<223> OTHER INFORMATION: primer

<400> SEQUENCE: 40
ctggcttatc gaaattaggc accccaggct taatac                               36

<210> SEQ ID NO 41
<211> LENGTH: 37
<212> TYPE: DNA
<213> ORGANISM: Artificial Sequence
<220> FEATURE:
<223> OTHER INFORMATION: primer

<400> SEQUENCE: 41
acgacggcca gtgagacggt tcctggcctt taatacg                              37
```

METHOD FOR INDUCING RNA SILENCING

This application is a Continuation of, and claims priority under 35 U.S.C. § 120 to, International Application No. PCT/JP2019/006324, filed Feb. 20, 2019, and claims priority therethrough under 35 U.S.C. § 119 to Japanese Patent Application No. 2018-028262, filed Feb. 20, 2018. Also, the Sequence Listing filed electronically on Aug. 14, 2020 is hereby incorporated by reference (File name: 2020-08-14T US-613_Seq_List; File size: 11 KB; Date recorded: Aug. 14, 2020).

BACKGROUND

Technical Field

The present invention relates to a method for inducing RNA silencing in a target organism.

Related Art

Techniques for inhibiting functional expression of a chosen gene by externally providing RNA in a target organism such as a pest have been known. Such techniques are referred to as, for example, RNA silencing. RNA for RNA silencing can be provided to a target organism, for example, solely or in combination with other ingredient(s) (Patent document 1 and Non-patent document 1). Also, RNA for RNA silencing can be expressed in a microorganism such as *Escherichia coli* and cells containing the RNA can be provided to a target organism as is, or after heat treatment (Patent documents 2 to 3).

Patent Documents

Patent document 1: WO2010/140675
Patent document 2: US2013-0011372
Patent document 3: U.S. Pat. No. 9,445,603

Non-patent Documents

Non-patent document 1: Zhu F, et. al., Ingested RNA interference for managing the populations of the Colorado potato beetle, Leptinotarsa decemlineata. Pest Manag Sci. 2011 February;67(2): 175-82.

SUMMARY

When RNA is provided to the natural world, the structural stability of the RNA may become a problem due to the degrading action or oxidation by electromagnetic waves such as UV, or RNA degrading enzymes in the environment. In addition, it is very expensive to isolate and purify RNA as a purified product. On the other hand, when cells of a microorganism expressing RNA are used in a viable form, there is a concern about adverse effects on the ecosystem due to release of the genetically modified organism into the environment. Furthermore, when cells of a microorganism expressing RNA are sterilized by heating (heat treatment) and used, there is a problem that the RNA contained in the cells is extremely decomposed by heat or a chemical reaction in the cells.

It is an aspect of the present invention is to provide a method for efficiently inducing RNA silencing in a target organism.

It is described herein that RNA silencing can be efficiently induced in a target organism by allowing the target organism to ingest cells of a microorganism having an ability to produce RNA for RNA silencing after treating the cells with an organic solvent.

It is an aspect of the present invention to provide a method for inducing RNA silencing in a target organism, the method comprising: allowing the target organism to ingest dead cells of a microorganism, wherein the microorganism has an ability to produce RNA for RNA silencing, wherein the dead cells have been subjected to a treatment with an organic solvent, and wherein the dead cells contain said RNA.

It is a further aspect of the present invention to provide the method, which further comprises preparing said dead cells of the microorganism by subjecting the cells of the microorganism to said treatment before said allowing.

It is a further aspect of the present invention to provide the method as described above, wherein the target organism is allowed to ingest the dead cells in an amount of 10 pg-RNA/individual to 10 μg-RNA/individual in terms of the amount of the RNA.

It is a further aspect of the present invention to provide a method for producing a composition for inducing RNA silencing in a target organism, the method comprising preparing said dead cells of a microorganism by subjecting the cells of a microorganism to a treatment with an organic solvent, wherein the composition comprises the dead cells, wherein the microorganism has an ability to produce RNA for RNA silencing, and wherein the dead cells comprise said RNA.

It is a further aspect of the present invention to provide the method as described above, wherein the organic solvent is an alcohol.

It is a further aspect of the present invention to provide the method as described above, wherein the organic solvent is ethanol or methanol.

It is a further aspect of the present invention to provide the method as described above, wherein the concentration of the organic solvent in the treatment is 30% (v/v) or higher when the organic solvent is ethanol and 50% (v/v) or higher when the organic solvent is methanol.

It is a further aspect of the present invention to provide the method as described above, wherein the treatment is carried out for 1 minute or longer.

It is a further aspect of the present invention to provide the method as described above, wherein the microorganism is a coryneform bacterium or a bacterium belonging to the family Enterobacteriaceae.

It is a further aspect of the present invention to provide the method as described above, wherein the microorganism is a bacterium belonging to the genus *Corynebacterium* or a bacterium belonging to the genus *Escherichia*.

It is a further aspect of the present invention to provide the method as described above, wherein the microorganism is *Corynebacterium glutamicum* or *Escherichia coli*.

It is a further aspect of the present invention to provide the method as described above, wherein the microorganism has been modified so that the activity of ribonuclease III is reduced as compared with a non-modified strain.

It is a further aspect of the present invention to provide the method as described above, wherein the target organism is a pest.

It is a further aspect of the present invention to provide a composition for inducing RNA silencing in a target organism, wherein the composition comprises dead cells of a microorganism, wherein the microorganism has an ability to produce RNA for RNA silencing, wherein the dead cells have been subjected to a treatment with an organic solvent, and wherein the dead cells comprise said RNA.

It is a further aspect of the present invention to provide the composition as described above, wherein the organic solvent is an alcohol.

It is a further aspect of the present invention to provide the composition as described above, wherein the organic solvent is ethanol or methanol.

It is a further aspect of the present invention to provide the composition as described above, wherein the concentration of the organic solvent in the treatment is 30% (v/v) or higher when the organic solvent is ethanol and 50% (v/v) or higher when the organic solvent is methanol.

It is a further aspect of the present invention to provide the composition as described above, wherein the treatment is carried out for 1 minute or longer.

It is a further aspect of the present invention to provide the composition as described above, wherein the microorganism is a coryneform bacterium or a bacterium belonging to the family Enterobacteriaceae.

It is a further aspect of the present invention to provide the composition as described above, wherein the microorganism is a bacterium belonging to the genus *Corynebacterium* or a bacterium belonging to the genus *Escherichia*.

It is a further aspect of the present invention to provide the composition as described above, wherein the microorganism is *Corynebacterium glutamicum* or *Escherichia coli*.

It is a further aspect of the present invention to provide the composition as described above, wherein the microorganism has been modified so that the activity of ribonuclease III is reduced as compared with a non-modified strain.

It is a further aspect of the present invention to provide the composition as described above, wherein the target organism is a pest.

DETAILED DESCRIPTION

Figure 1:
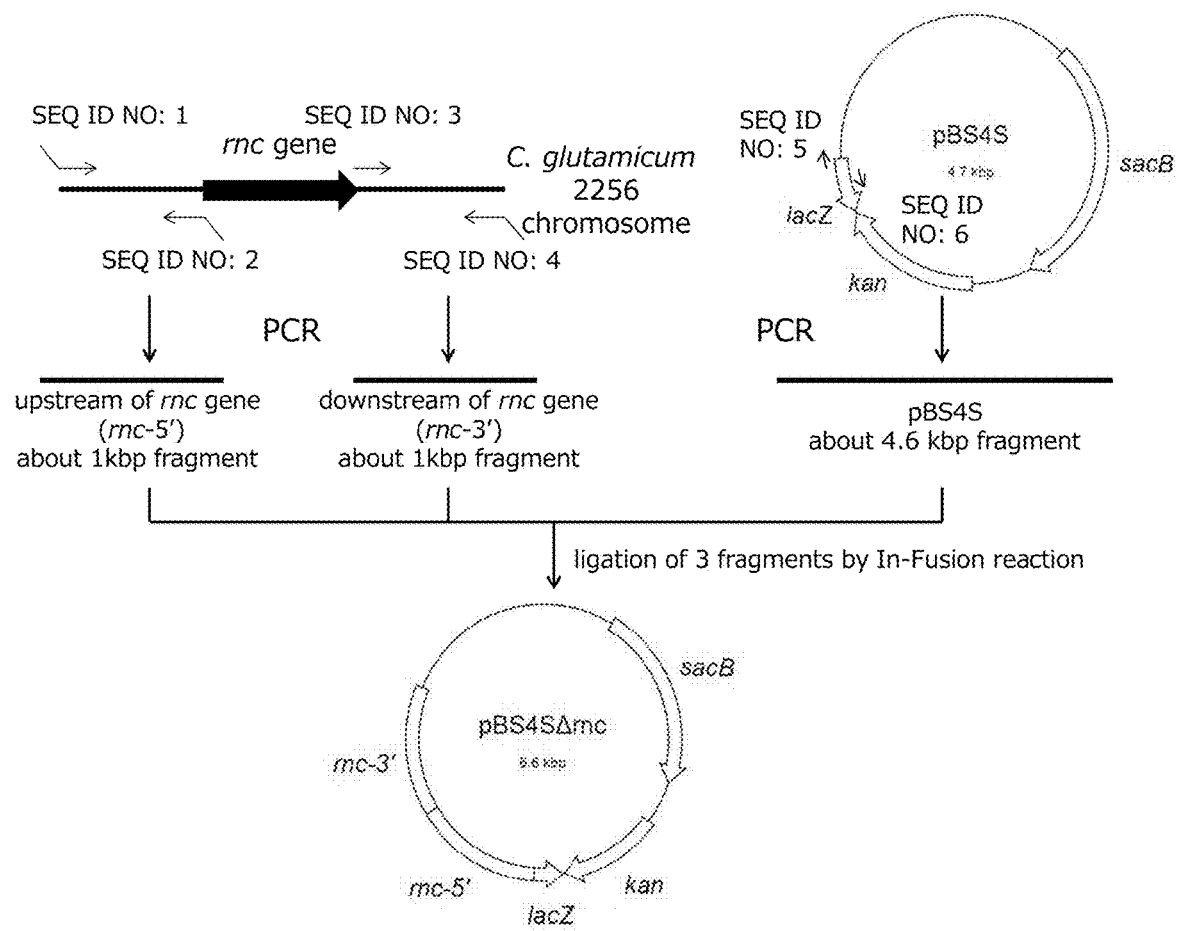
FIG. 1 shows a diagram showing a construction procedure of a plasmid pBS4SΔrnc.

As described herein, dead cells of a microorganism are used. The dead cells are also referred to as "active ingredient" or "dead cells as described herein". The microorganism is also referred to as "microorganism as described herein".

The dead cells are, specifically, cells of the microorganism, which have been subjected to a treatment with an organic solvent and contain RNA for RNA silencing. The treatment with an organic solvent is also referred to as "organic solvent treatment". The RNA for RNA silencing is also referred to as "objective RNA".

By using the active ingredient, specifically by allowing a target organism to ingest the active ingredient, RNA silencing can be induced in the target organism. That is, by using the active ingredient, specifically by allowing a target organism to ingest the active ingredient, an effect of inducing RNA silencing in the target organism can be obtained. This effect is also referred to as "RNA silencing-inducing effect".

The phrase "RNA silencing" refers to a phenomenon in which expression of a gene is suppressed due to the presence of the RNA. Examples of the RNA silencing include RNA interference and antisense method. A gene of which expression is suppressed by RNA silencing is also referred to as "target gene". RNA silencing may give rise to, for example, a phenotype depending on the type of the target gene or the degree of suppression of expression of the target gene. Examples of such a phenotype include suppression of activity of the target organism. That is, in one aspect, activity of the target organism can be suppressed by RNA silencing. Examples of the suppression of activity include inhibition of feeding, growth, and reproduction, and lethality. Examples of genes of which suppressed expression results in suppression of activity such as lethality include a gene encoding an apoptosis inhibitor. Suppression of activity of the target organism may result in, for example, elimination of the target organism. That is, in one aspect, the target organism can be eliminated by RNA silencing.

Furthermore, when the target organism causes harm, suppression of activity of the target organism may result in, for example, prevention of the harm caused by the target organism. That is, in one aspect, the harm caused by the target organism can be prevented by RNA silencing. Examples of the harm caused by the target organism include harm depending on the type of the target organism. Examples of the harm caused by the target organism include, for example, feeding damage. Specifically, for example, when the target organism is an agricultural pest, examples of the harm caused by the target organism include feeding damage of a plant. The RNA silencing-inducing effect can be confirmed using, for example, a reduction in expression of the target gene, a phenotype of the target organism, or prevention of the harm caused by the target organism as an index. The reduction in expression of the target gene can be confirmed in the same manner as the confirmation of a reduction in expression of a gene in the method for reducing the activity of a protein described below. The degree of the reduction in expression of the target gene is not particularly limited, so long as a desired result (for example, a desired phenotype) is obtained.

The expression level of the target gene when the active ingredient is used may be decreased to, for example, 90% or less, 70% or less, 50% or less, 30% or less, 20% or less, 10% or less, 5% or less, or 0% of that observed when the active ingredient is not used. The phenotype can be appropriately confirmed depending on the type of the phenotype. For example, the suppression of activity can be confirmed by using a reduction in the food intake, the body size, the number of viable individuals, the number of eggs laid, the number of hatches, or the hatching rate of the target organism as an index. The reduction in the food intake, the body size, the number of viable individuals, the number of eggs laid, the number of hatches, or the hatching rate of the target organism can be confirmed by measuring the food intake, body size, the number of viable individuals, the number of eggs laid, the number of hatches, or the hatching rate of the target organism, respectively. Specific examples of the number of viable individuals include the number of viable individuals per unit compartment, for example, per unit area or unit volume of the living sphere of the target organism. Specific examples of the number of eggs laid include the number of eggs laid per unit compartment, for example, per unit area or unit volume of the living area of the target organism, and the number of eggs laid per individual of the target organism. Specific examples of the number of hatches include the number of hatches per unit compartment, for example, per unit area or unit volume of the living sphere of the target organism, and the number of hatches per individual target organism. The prevention of harm can be appropriately confirmed depending on the type of the harm.

<1> Target Organism

The target organism is not particularly limited, so long as it can ingest the active ingredient, that is, the dead cells as described herein. Examples of the target organism include pests. Examples of the pests include agricultural pests, stored-grain pests, sanitary pests, food pests, property pests, livestock pests, and unpleasant pests.

Specific examples of the pests include organisms classified into the orders Lepidoptera (the families Plutellidae, Noctuidae, Pyrandae, Tortricidae, Lyonetiidae, Carposinidae, Gelechiidae, Crambidae, Arctiidae, Lymantriidae, etc.), Hemiptera (the families Cicadellidae, Delphacidae, Psyllidae, Aphididae, Aieyrodidae, Coccoidea, Miridae, Tingidae, Pentatomidae, Lygaeidae, etc.), Coleoptera (the families Scarabaeidae, Elateridae, Coccinellidae, Cerambycidae, Chrysomelidae, Curculionidae, etc.), Diptera (the families Muscidae, Calliphoridae, Sarcophagidae, Anthomyiidae, Tephritidae, Opomyzoidea, Chloropoidea, etc.), Orthoptera (the families Acrididae, Catantopinae, Pyrgomorphidae, etc.), Thysanoptera (the families Thnpidae, Aeolothripidae, Merothnpidae, etc.), Tylenchida (the families Aphelenchoididae, Neotylechidae, etc.), Collembola (the families Onychiuridae, Isotomidae, etc.), Acarina (the families Tetranychidae, Dennanyssidae, Acaridae, Sarcoptidae, etc.), Stylommatophora (the families Philomycidae, Bradybaenidae, etc.), Ascaridida (the families Ascarididae, Anisakidae, etc.), Opisthorchiida, Strigeidida, Blattodea (the families Blaberidae, Cryptocercidae, Panesthiidae, etc.), and Zygentoma (the families Ctenolepisma, Lepidotrichidae, Nicoletiidae, etc.).

Specific examples of pests of the order Lepidoptera include Chilo suppressahs, Cnaphalocrocis medinahs, Parnara guttata, Sesamia inferens, Mythimna separate, Naranga aenescens, Spodoptera litura, Etiella zinckenella, Etiella behrii, Matsumuraeses falcana, Leguminivora glycinivorella, Pleuroptya ruralis, Agrotis segetum, Agrotis ipsilon, Helcystogramma triannulella, Xestia c-nigrum, Helicoverpa assulta, Helicoverpa armigera, Mamestra brassicae, Spodoptera exigua, Plutella xylostella, Pieris rapae, Pieris brassicae, Hellulla undahs, and Autographa nigrisigna.

Specific examples of pests of the order Hemiptera include Nilaparvata lugens, Sogatella furcifera, Laodelphax striatellus, Nephotettix cincticeps, Recilia dorsalis, Stenotus rubrovittatus, Trigonotylus caelestiahum, Leptocorisa chinensis, Nezara antennata, Nezara viridula, Lagynotomus elongatus, Scotinophara lurida, Eysarcoris aeneus, Eysarcoris lewisi, Eysarcoris ventralis, Togo hemipterus, Cletus punctiger, Piezodorus hybneri, Halyomorpha halys, Dolycoris baccarum, Neotoxoptera formosana, Rhopalosiphum padi, Rhopalosiphum maidis, and Aphis glycines.

Specific examples of pests of the order Coleoptera include Lissorhoptrus oryzophilus, Oulema oryzae, Echinocnemus squamous, Melanotus legatus, Melanotus foltnumi, Anomala cuprea, Anomala cuprea, Popillia japonica, Maladera castanea, Epilachna varivestis, Medythia nigrobilineata, Epilachna vigintioctomaculata, Henosepilachna vigintioctopunctata, Harmonia axyridis, Anomala rufocuprea, Mimela testaceipes, Aulacophora femoralis, and Phyllotreta striolata.

Specific examples of pests of the order Diptera include Chlorops oryzae, Hydrellia griseola, Sitodiplosis mosellana, Delia platura, Asphondylia yushimai, Melanagromyza sojae, Liriomyza trifolii, Liriomyza sativae, Liriomyza huidobrensis, and Liriomyza bryoniae.

Specific examples of pests of the order Orthoptera include Oxya yezoensis and Oxya japonica. Specific examples of pests of the order Thysanoptera include Stenchaetothnps biformis and Thnps palmi. Specific examples of pests of the order Tylenchida include Meloidogyne nematodes, Pratylenchus nematodes, and Globodera nematodes. Specific examples of pests of the order Collembola include Onychiurus pseudarmatus and Onychiurus matsumotoi. Specific examples of pests of the order Acarina include Penthaleus major, Tetranychus urticae, Tetranychus kanzawai, Tyrophagus putrescentiae, and Tarsonemus bilobatus. Specific examples of pests of the order Stylommatophora include snails and slugs. Specific examples of pests of the order Ascaridida include Ascaris lumbricoides. Specific examples of pests of the order Opisthorchiida include Metagonimus yokogawai. Specific examples of pests of the order Strigeidida include Schistosoma japonicum. Specific examples of pests of the order Blattodea include Blattella germanica, Periplaneta fuliginosa, Periplaneta Americana, and Blatta lateralis. Specific examples of pests of the order Zygentoma include Ctenolepisma villosa and Lepisma saccharina.

As the target organism, a single kind of target organism may be targeted or two or more kinds of target organisms may be targeted.

<2> Active Ingredient and Preparation Thereof

The active ingredient, that is, the dead cells of the present invention, can be obtained by subjecting the cells to an organic solvent treatment. That is, a method is provided for producing the active ingredient that includes a step of subjecting the cells of the microorganism to an organic solvent treatment. This step is also referred to as "organic solvent treatment step". The organic solvent treatment step may be, specifically, a step of subjecting the cells of the microorganism to the organic solvent treatment, to thereby prepare the active ingredient.

The cells of the microorganism can be obtained by culturing the microorganism. The method for producing the active ingredient may further include a step of culturing the microorganism before the organic solvent treatment step. This step is also referred to as "culturing step". The culturing step may be, specifically, a step of culturing the microorganism to thereby prepare the cells of the microorganism. The method for producing the active ingredient may be, for example, a step of culturing the microorganism, and a step of subjecting cells obtained by said culturing to the organic solvent treatment.

<2-1> Microorganism

The microorganism as described herein is not particularly limited, so long as the active ingredient, that is, the dead cells, can be prepared therefrom. The active ingredient includes the objective RNA. Hence, the cells to be subjected to the organic solvent treatment, that is, the cells of the microorganism include the objective RNA. Therefore, the microorganism has an objective RNA-producing ability. The microorganism may have an ability to produce a single kind of objective RNA or may have an ability to produce two or more kinds of objective RNAs. Similarly, the active ingredient and the cells to be subject to the organic solvent treatment, that is, the cells of the microorganism, may each include a single kind of objective RNA or two or more kinds of objective RNAs.

The microorganism has the objective RNA-producing ability at least due to possession of an expression unit for the objective RNA. That is, the microorganism has an expression unit for the objective RNA. A microorganism having an expression unit for the objective RNA can be obtained by introducing the expression unit for the objective RNA into a microorganism. The microorganism may be, for example, a microorganism that has acquired the objective RNA-producing ability due to introduction of the expression unit for the objective RNA, or due to a combination of introduction of the expression unit for the objective RNA and other characteristic(s).

The microorganism may have any characteristic(s), so long as the microorganism has the objective RNA-producing ability. For example, the microorganism may or may not have a vector such as plasmid, other than a vector containing the expression unit for the objective RNA. That is, for example, when the microorganism inherently has a plasmid, the plasmid may be cured (removed). Furthermore, the microorganism may have been modified so that the activity of ribonuclease III (RNaseIII) is reduced. The order of carrying out modifications for constructing the microorganism is not particularly limited.

Incidentally, the microorganism or a microorganism used for constructing the same can also be referred to as "host".

<2-1-1> Microorganism having Objective RNA-Producing Ability

The phrase "a microorganism having an objective RNA-producing ability" refers to a microorganism having an ability to express and accumulate the objective RNA in cells of the microorganism to such a degree that the RNA silencing-inducing effect can be obtained. The microorganism having the objective RNA-producing ability may also be, for example, a microorganism that is able to accumulate the objective RNA in cells of the microorganism in an amount of 1 mg/L-culture or more, 2 mg/L-culture or more, 5 mg/L-culture or more, 10 mg/L-culture or more, 20 mg/L-culture or more, 50 mg/L-culture or more, or 100 mg/L-culture or more.

Examples of the microorganism include bacteria and yeast.

Examples of the bacteria include bacteria belonging to the family Enterobacteriaceae and coryneform bacteria.

Examples of bacteria belonging to the family Enterobacteriaceae include bacteria belonging to the genus *Escherichia*, *Enterobacter*, *Pantoea*, *Klebsiella*, *Serratia*, *Erwinia*, *Photorhabdus*, *Providencia*, *Salmonella*, *Morganella*, or the like. Specifically, bacteria classified into the family Enterobacteriaceae according to the taxonomy used in the NCBI (National Center for Biotechnology Information) database (ncbi.nlm.nih.gov/Taxonomy/Browser/www-tax.cgi?id=91347) can be used.

The *Escherichia* bacteria are not particularly limited, and examples thereof include those classified into the genus *Escherichia* according to the taxonomy known to those skilled in the field of microbiology. Examples of the *Escherichia* bacteria include, for example, those described in the work of Neidhardt et al. (Backmann B. J., 1996, Derivations and Genotypes of some mutant derivatives of *Escherichia coli* K-12, pp.2460-2488, Table 1, In F. D. Neidhardt (ed.), *Escherichia coli* and *Salmonella* Cellular and Molecular Biology/Second Edition, American Society for Microbiology Press, Washington, D.C.). Examples of the *Escherichia* bacteria include, for example, *Escherichia coli*. Specific examples of *Escherichia coli* include, for example, *Escherichia coli* K-12 strains such as W3110 strain (ATCC 27325) and MG1655 strain (ATCC 47076); *Escherichia coli* K5 strain (ATCC 23506); *Escherichia coli* B strains such as BL21 (DE3) strain; and derivative strains thereof.

The *Enterobacter* bacteria are not particularly limited, and examples include those classified into the genus *Enterobacter* according to the taxonomy known to those skilled in the field of microbiology. Examples the *Enterobacter* bacterium include, for example, *Enterobacter agglomerans* and *Enterobacter aerogenes*. Specific examples of *Enterobacter agglomerans* include, for example, the *Enterobacter agglomerans* ATCC 12287 strain. Specific examples of *Enterobacter aerogenes* include, for example, the *Enterobacter aerogenes* ATCC 13048 strain, NBRC 12010 strain (Biotechnol. Bioeng., 2007, Mar. 27; 98(2):340-348), and AJ110637 strain (FERM BP-10955). Examples the *Enterobacter* bacteria can also include, for example, the strains described in European Patent Application Laid-open (EP-A) No. 0952221. In addition, *Enterobacter agglomerans* can also include some strains classified as *Pantoea agglomerans*.

The *Pantoea* bacteria are not particularly limited, and examples include those classified into the genus *Pantoea* according to the taxonomy known to those skilled in the field of microbiology. Examples the *Pantoea* bacteria include, for example, *Pantoea ananatis*, *Pantoea stewartii*, *Pantoea agglomerans*, and *Pantoea citrea*. Specific examples of *Pantoea ananatis* include, for example, the *Pantoea ananatis* LMG20103 strain, AJ13355 strain (FERM BP-6614), AJ13356 strain (FERM BP-6615), AJ13601 strain (FERM BP-7207), SC17 strain (FERM BP-11091), SC17(0) strain (VKPM B-9246), and SC17sucA strain (FERM BP-8646). Some of *Enterobacter* bacteria and *Erwinia* bacteria were reclassified into the genus *Pantoea* (Int. J. Syst. Bacteriol., 39, 337-345 (1989); Int. J. Syst. Bacteriol., 43, 162-173 (1993)). For example, some strains of *Enterobacter agglomerans* were recently reclassified into *Pantoea agglomerans*, *Pantoea ananatis*, *Pantoea stewartii*, or the like on the basis of nucleotide sequence analysis of 16S rRNA etc. (Int. J. Syst. Bacteriol., 39, 337-345 (1989)). The *Pantoea* bacteria also include those reclassified into the genus *Pantoea* as described above.

Examples of the *Erwinia* bacteria include *Erwinia amylovora* and *Erwinia carotovora*. Examples of the *Klebsiella* bacteria include *Klebsiella planticola*.

Examples of coryneform bacteria include bacteria belonging to the genus *Corynebacterium*, *Brevibacterium*, *Mycobacterium*, *Microbacterium*, or the like.

Specific examples of such coryneform bacteria include the following species:
*Corynebacterium acetoacidophilum*
*Corynebacterium acetoglutamicum*
*Corynebacterium alkanolyticum*
*Corynebacterium callunae*
*Corynebacterium crenatum*
*Corynebacterium glutamicum*
*Corynebacterium lilium*
*Corynebacterium melassecola*

*Corynebacterium thermoaminogenes (Corynebacterium efficiens)*
*Corynebacterium herculis*
*Brevibacterium divaricatum (Corynebacterium glutamicum)*
*Brevibacterium flavum (Corynebacterium glutamicum)*
*Brevibacterium immariophilum*
*Brevibacterium lactofermentum (Corynebacterium glutamicum)*
*Brevibacterium roseum*
*Brevibacterium saccharolyticum*
*Brevibacterium thiogenitalis*
*Corynebacterium ammoniagenes (Corynebacterium stationis)*
*Brevibacterium album*
*Brevibacterium cerinum*
*Microbacterium ammoniaphilum*

Specific examples of the coryneform bacteria include the following strains:
*Corynebacterium acetoacidophilum* ATCC 13870
*Corynebacterium acetoglutamicum* ATCC 15806
*Corynebacterium alkanolyticum* ATCC 21511
*Corynebacterium callunae* ATCC 15991
*Corynebacterium crenatum* AS1.542
*Corynebacterium glutamicum* ATCC 13020, ATCC 13032, ATCC 13060, ATCC 13869, FERM BP-734
*Corynebacterium lilium* ATCC 15990
*Corynebacterium melassecola* ATCC 17965
*Corynebacterium efficiens (Corynebacterium thermoaminogenes)* AJ12340 (FERM BP-1539)
*Corynebacterium herculis* ATCC 13868
*Brevibacterium divaricatum (Corynebacterium glutamicum)* ATCC 14020
*Brevibacterium flavum (Corynebacterium glutamicum)* ATCC 13826, ATCC 14067, AJ12418 (FERM BP-2205)
*Brevibacterium immariophilum* ATCC 14068
*Brevibacterium lactofennentum (Corynebacterium glutamicum)* ATCC 13869
*Brevibacterium roseum* ATCC 13825
*Brevibacterium saccharolyticum* ATCC 14066
*Brevibacterium thiogenitalis* ATCC 19240
*Corynebacterium ammoniagenes (Corynebacterium stationis)* ATCC 6871, ATCC 6872
*Brevibacterium album* ATCC 15111
*Brevibacterium cerinum* ATCC 15112
*Microbacterium ammoniaphilum* ATCC 15354

The coryneform bacteria include bacteria that had previously been classified into the genus Brevibacterium, but are presently united into the genus *Corynebacterium* (Int. J. Syst. Bacteriol., 41, 255 (1991)). Moreover, *Corynebacterium stationis* include bacteria that had previously been classified as *Corynebacterium ammoniagenes*, but are presently re-classified into *Corynebacterium stationis* on the basis of nucleotide sequence analysis of 16S rRNA etc. (Int. J. Syst. Evol. Microbiol., 60, 874-879 (2010)).

The yeast may be budding yeast or may be fission yeast. The yeast may be haploid yeast or may be diploid or more polyploid yeast. Examples of the yeast include yeast belonging to the genus *Saccharomyces* such as *Saccharomyces cerevisia*, the genus *Pichia* (also referred to as the genus *Wickerhamomyces*) such as *Pichia ciferrii, Pichia sydowiorum*, and *Pichia pastoris*, the genus *Candida* such as *Candida utilis*, the genus *Hansenula* such as *Hansenula polymorpha*, and the genus *Schizosaccharomyces* such as *Schizosaccharomyces pombe*.

These strains are available from, for example, the American Type Culture Collection (Address: 10801 University Blvd., P.O. Box 1549, Manassas, VA 20108, United States of America). That is, registration numbers are given to the respective strains, and the strains can be ordered by using these registration numbers (refer to atcc.org/). The registration numbers of the strains are listed in the catalogue of the American Type Culture Collection. These strains can also be obtained from, for example, the depositories at which the strains were deposited.

<2-1-2> Introduction of Expression Unit for Objective RNA

The objective RNA is RNA for RNA silencing. The phrase "RNA for RNA silencing" refers to RNA capable of inducing (causing) RNA silencing in the target organism. As the objective RNA, a single kind of objective RNA may be used or two or more kinds of objective RNAs may be used. Furthermore, for a single kind of target gene, a single kind of objective RNA may be used or two or more kinds of objective RNAs may be used. When two or more kinds of objective RNAs are used, these objective RNAs may be expressed in a single microorganism or in a plurality of microorganisms.

The objective RNA is not particularly limited, so long as the RNA silencing-inducing effect can be obtained. The objective RNA may be RNA inducing the RNA silencing-inducing effect for a single kind of target gene or RNA inducing the RNA silencing-inducing effect for two or more kinds of target genes. The objective RNA can be appropriately selected according to various conditions such as the type of the target organism, the type of the target gene, and the mode of RNA silencing.

Examples of the objective RNA include RNA hybridizable with RNA transcribed from the target gene. Examples of the objective RNA also include RNA that generates RNA hybridizable with RNA transcribed from the target gene. That is, the objective RNA may be, for example, RNA hybridizable with RNA transcribed from the target gene, as it is or after being appropriately modified. Specifically, for example, when the objective RNA is structured and expressed as long double-stranded RNA (dsRNA) for RNA interference, it is sufficient that short double-stranded RNA (siRNA) is generated from the dsRNA, single-stranded RNA is further generated from the siRNA, and the single-stranded RNA hybridizes with RNA transcribed from the target gene. Such a modification may be carried out, for example, after the target organism ingests the active ingredient.

For the aforementioned hybridization, the objective RNA may have, for example, a nucleotide sequence complementary to the nucleotide sequence of RNA transcribed from the target gene or a partial sequence thereof. The nucleotide sequence of RNA transcribed from the target gene is also referred to as "sense sequence". Also, the aforementioned complementary sequence, that is, a nucleotide sequence complementary to the sense sequence or a partial sequence thereof, is also referred to as "antisense sequence". That is, examples of the objective RNA include RNA having the antisense sequence. Examples of the objective RNA also include RNA having a variant sequence of the antisense sequence. The variant sequence is not particularly limited, so long as the RNA silencing-inducing effect can be obtained, specifically, for example, so long as the objective RNA is able to hybridize with RNA transcribed from the target gene. The descriptions concerning variants of the ribonuclease III gene mentioned later can be similarly applied to the variant sequence. The objective RNA may also have, for example, a combination of two or more nucleotide sequences selected from such nucleotide sequences of RNA as mentioned above. The objective RNA may also have, for example, two or more copies of the antisense sequence or a variant sequence thereof for a single kind of target gene. The objective RNA may also have, for example, two or more kinds of antisense sequence or a variant sequence thereof for a single kind of target gene. The objective RNA may also have, for example, the antisense sequence or a variant sequence thereof for each of two or more kinds of target genes. The expression "having a nucleotide sequence" means "including the nucleotide sequence" unless otherwise stated, and also includes cases of "having only the nucleotide sequence". That is, the objective RNA may have only the antisense sequence or a variant sequence thereof, or may further include another nucleotide sequence. The other nucleotide sequence is not particularly limited, so long as the RNA silencing-inducing effect can be obtained, specifically, for example, so long as the objective RNA is hybridizable with RNA transcribed from the target gene.

The objective RNA may be, for example, single-stranded RNA, such as RNA consisting of one molecule of RNA chain, or double-stranded RNA, such as RNA consisting of two molecules of RNA chain. The double-stranded RNA may be a double strand consisting of a single kind of RNA molecule (homo-double strand), or a double strand consisting of two different kinds of RNA molecules (hetero-double strand). Specific examples of the double-stranded RNA include, for example, double-stranded RNA consisting of an RNA strand and a complementary strand thereof. The objective RNA may also be, for example, a double strand consisting of one molecule of RNA chain and one molecule of DNA chain. The objective RNA may contain both a single-stranded region and a double-stranded region. That is, for example, the single-stranded RNA may partially form a double-stranded structure, such as stem-loop structure, within a molecule. Also, for example, the double-stranded RNA may partially contain a single-stranded structure. In cases of inducing RNA interference, the objective RNA may be structured and expressed as, for example, long double-stranded RNA (dsRNA) or short double-stranded RNA (siRNA). The RNA to be used for RNA interference need not consist of two molecules of RNA chain. That is, for RNA interference, single-stranded RNA forming a double-stranded structure within a molecule, such as short hairpin RNA (shRNA) having a hairpin-like shape, can be used instead of double-stranded RNA. Furthermore, in cases of the antisense method, the objective RNA may be structured and expressed as, for example, single-stranded RNA.

The length of the objective RNA is not particularly limited. The length of the objective RNA, for example, may be 20 residues or more, 50 residues or more, or 100 residues or more, or may be 10000 residues or less, 5000 residues or less, 2000 residues or less, 1000 residues or less, or 500 residues or less, or may be a range defined as a combination thereof. The length of the antisense sequence or a variant sequence thereof possessed by the objective RNA, for example, may be 20 residues or more, 50 residues or more, or 100 residues or more, or may be 10000 residues or less, 5000 residues or less, 2000 residues or less, 1000 residues or less, or 500 residues or less, or may be a range defined as a combination thereof.

The term "expression unit for objective RNA" refers to a genetic construct configured so that the objective RNA can be expressed therefrom. The expression unit for the objective RNA contains a promoter sequence that functions in a host and a nucleotide sequence encoding the objective RNA in the direction from 5' to 3'. The promoter sequence is also simply referred to as "promoter". The nucleotide sequence encoding the objective RNA is also referred to as "gene encoding objective RNA" or "objective RNA gene". It is sufficient that the objective RNA gene is ligated downstream of a promoter so that the objective RNA is expressed under control of the promoter. The expression unit for the objective RNA may also contain regulator sequence(s) effective for expressing the objective RNA in a host, such as operator and terminator, at appropriate position(s) so that the regulator sequence(s) can function. Incidentally, the terms "expression of an objective RNA gene", "transcription of an objective RNA gene", "expression of objective RNA", and "transcription of objective RNA" may be used synonymously with each other. The expression unit for the objective RNA can be appropriately designed according to various conditions such as the type and transcription pattern of the objective RNA.

The transcription pattern of the objective RNA is not particularly limited so long as the objective RNA is obtained. The objective RNA gene may be transcribed, for example, in one direction, that is, by using either one strand of a double strand as the template, or in both directions, that is, by using both strands of a double strand as the template. Transcription of the objective RNA gene in both directions can be performed by transcribing the gene from promoters arranged interposing the gene in mutually opposite directions, such as promoters arranged at 5'-side of the gene in the respective strands of a double strand. That is, the expression unit for the objective RNA may contain such two promoters. In such a case, the two promoters may or may not be identical to each other. By transcribing the objective RNA gene in one direction, there can be typically obtained single-stranded RNA. By transcribing the objective RNA gene in both directions, there can be typically obtained double-stranded RNA. Double-stranded RNA can also be obtained by transcribing both strands of the double-stranded RNA from the respective expression units thereof.

The objective RNA gene can be obtained by, for example, cloning. For cloning, for example, nucleotides containing the objective RNA gene, such as genomic DNA and cDNA, can be used. The objective RNA gene can also be obtained by, for example, total synthesis on the basis of the nucleotide sequence thereof (Gene, 60(1), 115-127 (1987)). The obtained objective RNA gene can be used as it is, or after being modified as required. That is, a variant of the objective RNA gene may be obtained by modifying the gene. A gene can be modified by a known technique. For example, an objective mutation can be introduced into an objective site of DNA by the site-specific mutation method. Examples of the site-specific mutation method include the method of utilizing PCR (Higuchi, R., 61, in PCR Technology, Erlich, H. A. Eds., Stockton Press (1989); Carter, P, Meth. in Enzymol., 154, 382 (1987)), and the method of utilizing phage (Kramer, W. and Frits, H. J., Meth. in Enzymol., 154, 350 (1987); Kunkel, T. A. et al., Meth. in Enzymol., 154, 367 (1987)). Alternatively, a variant of the objective RNA gene may be totally synthesized. In addition, the expression unit for the objective RNA can be obtained by appropriately applying modification, such as introduction of a promoter sequence, to the obtained objective RNA gene. Incidentally, other elements constituting the expression unit for the objective RNA, such as a promoter sequence, or the whole of the expression unit for the objective RNA can be obtained in the same manner as the objective RNA gene.

The promoter for expressing the objective RNA gene is not particularly limited so long as it functions in the host.

The term "promoter that functions in a host" refers to a promoter that shows a promoter activity, i.e. gene transcription activity, in the host. The promoter may be a promoter derived from the host, or a heterogenous promoter. The promoter may be the native promoter of the objective RNA gene, or a promoter of another gene. The promoter may be an inducible promoter or a constitutive promoter for gene expression.

Examples of the promoter include, for example, promoters of genes of the glycolytic pathway, pentose phosphate pathway, TCA cycle, amino acid biosynthesis systems, and cell surface layer proteins. As the promoter, such a strong promoter as mentioned below may also be used. Examples of the strong promoter that function in Enterobacteriaceae bacteria such as *Escherichia coli* include, for example, T7 promoter, T5 promoter, T3 promoter, SP6 promoter, F1 promoter, trp promoter, trc promoter, lac promoter, tac promoter, tet promoter, araBAD promoter, rpoH promoter, msrA promoter, Pm1 promoter (derived from the genus *Bifidobacterium*), PR promoter, and PL promoter. Examples of the strong promoter that function in coryneform bacteria include, for example, the artificially modified P54-6 promoter (Appl. Microbiol. Biotechnol., 53, 674-679 (2000)); pta, aceA, aceB, adh, and amyE promoters inducible with acetic acid, ethanol, pyruvic acid, or the like; and cspB, SOD, and tuf promoters, which are potent promoters (Journal of Biotechnology, 104 (2003) 311-323; Appl. Environ. Microbiol., 2005 December; 71 (12):8587-96); as well as lac promoter, tac promoter, trc promoter, F1 promoter, T7 promoter, T5 promoter, T3 promoter, and SP6 promoter. Particular examples of the promoter include promoters derived from phages, such as F1 promoter, T7 promoter, T5 promoter, T3 promoter, and SP6 promoter. The nucleotide sequence of the F1 promoter is shown as SEQ ID NO: 17.

As the promoter, a highly-active type of an existing promoter may also be obtained and used by using various reporter genes. For example, by making the −35 and −10 regions in a promoter region closer to a consensus sequence, the activity of the promoter can be enhanced (WO00/18935). Examples of highly active-type promoter include various tac-like promoters (Katashkina J I et al., Russian Federation Patent Application No. 2006134574) and pnlp8 promoter (WO2010/027045). Methods for evaluating the strength of promoters and examples of strong promoters are described in the paper of Goldstein et al. (Prokaryotic Promoters in Biotechnology, Biotechnol. Annu. Rev., 1, 105-128 (1995)), and so forth.

The promoter may be a promoter having any of the nucleotide sequences of the promoters exemplified above (e.g. the nucleotide sequence shown as SEQ ID NO: 17). The promoter may also be a conservative variant of any of the promoters exemplified above (e.g. a promoter having the nucleotide sequence shown as SEQ ID NO: 17). That is, the promoters exemplified above each can be used as they are, or after being modified as required. Promoters defined with the above-mentioned promoter names include not only the promoters exemplified above, respectively, but also include conservative variants thereof. Namely, for example, the term "F1 promoter" includes not only a promoter having the nucleotide sequence shown as SEQ ID NO: 17, but also includes conservative variants thereof. The descriptions concerning conservative variants of the ribonuclease III gene mentioned later can be similarly applied to conservative variants of promoters. For example, the promoter may be a promoter having a nucleotide sequence showing a homology of, for example, 80% or more, 90% or more, 95% or more, 97% or more, or 99% or more, to the nucleotide sequence shown as SEQ ID NO: 17, so long as the original function is maintained. Incidentally, the term "original function" used for promoters refers to a function of promoting the expression of a gene ligated immediately downstream thereof under certain conditions. The term "certain conditions" refers to conditions under which the original promoter promotes the expression of a gene ligated immediately downstream thereof. A conservative variant of a promoter may have a transcription activity of, for example, 80% or more, 90% or more, or 100% or more, of that of the original promoter. The presence or absence of gene expression and intensity of gene expression (transcription activity) can be confirmed by, for example, using a reporter gene.

A terminator for termination of transcription may be located downstream of the objective RNA gene. The terminator is not particularly limited so long as it functions in the host. The terminator may be a terminator derived from the host, or a heterogenous terminator. The terminator may be the native terminator of the objective RNA gene, or a terminator of another gene. Specific examples of the terminator include, for example, the terminator of bacteriophage BFK20, T7 terminator, T4 terminator, fd-phage terminator, tet terminator, and trpA terminator.

Vectors, promoters, and terminators available in various microorganisms are disclosed in detail in "Fundamental Microbiology Vol. 8, Genetic Engineering, KYORITSU SHUPPAN CO., LTD, 1987", and those can be used.

Methods for introducing the expression unit for the objective RNA into a host are not particularly limited. The phrase "introduction of an expression unit for objective RNA" refers to making a host harbor the expression unit for the objective RNA, and may specifically refer to expressively introducing the objective RNA gene into a host. The phrase "introduction of an expression unit for objective RNA" includes not only collectively introducing the expression unit for the objective RNA that has been preliminarily constructed into a host, but also includes introducing at least the objective RNA gene into a host so as to construct the expression unit for the objective RNA in the host, unless otherwise stated. In the microorganism, the expression unit for the objective RNA may be present in a vector autonomously replicable separately from the chromosome, such as plasmid, or may be integrated into the chromosome. That is, the microorganism, for example, may have the expression unit for the objective RNA on a vector, and in other words, may have a vector containing the expression unit for the objective RNA. The microorganism, for example, may also have the expression unit for the objective RNA on the chromosome. The microorganism may have only one copy of the expression unit for the objective RNA, or two or more copies of the expression unit for the objective RNA. The copy number of the expression unit for the objective RNA possessed by the microorganism, for example, may be 5 copies/cell or more, 10 copies/cell or more, 20 copies/cell or more, 30 copies/cell or more, 50 copies/cell or more, 70 copies/cell or more, 100 copies/cell or more, 150 copies/cell or more, 200 copies/cell or more, 300 copies/cell or more, 500 copies/cell or more, 1000 copies/cell or more, or may be 2000 copies/cell or less, 1500 copies/cell or less, 1000 copies/cell or less, 500 copies/cell or less, or 300 copies/cell or less, or may be a range defined as a non-contradictory combination thereof. The microorganism may have only one kind of expression unit for the objective RNA, or two or more kinds of expression units for the objective RNA. The copy number and kind of the expression unit for the objective RNA may also be read as the copy number and kind of the objective RNA gene, respectively. When the microorganism has two or more expression units for the objective RNA, it is sufficient that those expression units are harbored by the microorganism so that the objective RNA is produced. For example, all of those expression units may be harbored on a single expression vector or on the chromosome. Alternatively, those expression units may be harbored separately on a plurality of expression vectors, or separately on a single or plurality of expression vectors and the chromosome.

The expression unit for the objective RNA can be introduced into a host by, for example, using a vector containing the expression unit for the objective RNA. The vector containing the expression unit for the objective RNA is also referred to as "expression vector for objective RNA". The expression vector for the objective RNA can be constructed by, for example, ligating the expression unit for the objective RNA with a vector. Alternatively, for example, when a vector contains a promoter that functions in a host, the expression vector for the objective RNA can also be constructed by ligating the objective RNA gene downstream of the promoter. By transforming a host with the expression vector for the objective RNA, a transformant into which the vector has been introduced can be obtained, namely, the expression unit for the objective RNA can be introduced into the host. As the vector, a vector autonomously replicable in cells of the host can be used. The vector can be a multi-copy vector. The copy number of the vector, for example, may be 5 copies/cell or more, 10 copies/cell or more, 20 copies/cell or more, 30 copies/cell or more, 50 copies/cell or more, 70 copies/cell or more, 100 copies/cell or more, 150 copies/cell or more, 200 copies/cell or more, 300 copies/cell or more, 500 copies/cell or more, 1000 copies/cell or more, or may be 2000 copies/cell or less, 1500 copies/cell or less, 1000 copies/cell or less, 500 copies/cell or less, or 300 copies/cell or less, or may be a range defined as a non-contradictory combination thereof. Furthermore, the vector can contain a marker such as an antibiotic resistance gene or auxotrophy-complementing gene for selection of transformants. Furthermore, the vector may contain a promoter and/or terminator for expressing the introduced gene. The vector may be, for example, a vector derived from a bacterial plasmid, a vector derived from a yeast plasmid, a vector derived from a bacteriophage, cosmid, phagemid, or the like. Specific examples of vector autonomously replicable in Enterobacteriaceae bacteria such as *Escherichia coli* include, for example, pUC19, pUC18, pHSG299, pHSG399, pHSG398, pBR322, pSTV29 (all of these are available from Takara Bio), pACYC184, pMW219 (NIPPON GENE), pTrc99A (Pharmacia), pPROK series vectors (Clontech), pKK233-2 (Clontech), pET series vectors (Novagen), pQE series vectors (QIAGEN), pCold TF DNA (Takara Bio), pACYC, L4440 (US2017-0137841), and the broad host spectrum vector RSF1010. Specific examples of vectors autonomously replicable in coryneform bacteria include, for example, pHM1519 (Agric. Biol. Chem., 48, 2901-2903 (1984)); pAM330 (Agric. Biol. Chem., 48, 2901-2903 (1984)); plasmids obtained by improving these and having a drug resistance gene; pCRY30 (Japanese Patent Laid-open (Kokai) No. 3-210184); pCRY21, pCRY2KE, pCRY2KX, pCRY31, pCRY3KE, and pCRY3KX (Japanese Patent Laid-open (Kokai) No. 2-72876 and U.S. Pat. No. 5,185,262); pCRY2 and pCRY3 (Japanese Patent Laid-open (Kokai) No. 1-191686); pAJ655, pAJ611, and pAJ1844 (Japanese Patent Laid-open (Kokai) No. 58-192900); pCG1 (Japanese Patent Laid-open (Kokai) No. 57-134500); pCG2 (Japanese Patent Laid-open (Kokai) No. 58-35197); pCG4 and pCG11 (Japanese Patent Laid-open (Kokai) No. 57-183799); pPK4 (U.S. Pat. No. 6,090,597); pVK4 (Japanese Patent Laid-open (Kokai) No. 9-322774); pVK7 (Japanese Patent Laid-open (Kokai) No. 10-215883); pVK9 (US2006-0141588); pVC7 (Japanese Patent Laid-open (Kokai) No. 9-070291); and pVS7 (WO2013/069634). Specific examples of vectors autonomously replicable in coryneform bacteria also include, for example, pVC7H2 (present Examples), which is a variant of pVC7.

Furthermore, the expression unit for the objective RNA can be introduced into the chromosome of a host by, for example, using a transposon such as artificial transposon. When a transposon is used, the expression unit for the objective RNA can be introduced into the chromosome via homologous recombination or due to the transposition activity thereof. The expression unit for the objective RNA can also be introduced into the chromosome of a host by introduction methods utilizing homologous recombination. Examples of the introduction methods utilizing homologous recombination include, for example, methods of using a linear DNA, a plasmid containing a temperature sensitive replication origin, a plasmid capable of conjugative transfer, a suicide vector not having a replication origin that functions in a host, or the like. Only one copy or two or more copies of the expression unit for the objective RNA may be introduced. For example, by performing homologous recombination using a sequence present in multiple copies on a chromosome as a target, multiple copies of the expression unit for the objective RNA can be introduced into the chromosome. Examples of the sequence present in multiple copies on a chromosome include repetitive DNAs, and inverted repeats located at the both ends of a transposon. In addition, at least the objective RNA gene may be introduced into the chromosome so as to construct the expression unit for the objective RNA on the chromosome. For example, by introducing the objective RNA gene downstream of a promoter sequence on the chromosome of a host, the expression unit for the objective RNA can be constructed on the chromosome. Incidentally, introduction of a part of the expression unit for the objective RNA, such as the objective RNA gene, into the chromosome can be performed in the same manner as introduction of the whole of the expression unit for the objective RNA into the chromosome.

Introduction of the expression unit for the objective RNA into a chromosome can be confirmed by, for example, Southern hybridization using a probe having a nucleotide sequence complementary to the whole or a part of the expression unit, or PCR using primers prepared on the basis of the nucleotide sequence of the expression unit.

Methods for transformation are not particularly limited, and generally used methods, such as the protoplast method (Gene, 39, 281-286(1985)), the electroporation method (Bio/Technology, 7, 1067-1070(1989)), and the electric pulse method (JP H2-207791 A), can be used.

<2-1-3> Reduction in Ribonuclease III Activity

The microorganism may have been modified so that the activity of ribonuclease III (RNaseIII) is reduced. Specifically, the microorganism has been modified so that the activity of ribonuclease III is reduced as compared with a non-modified strain. The activity of ribonuclease III may be reduced to, for example, 50% or less, 20% or less, 10% or less, 5% or less, or 0% of that of a non-modified strain. That is, the microorganism may have been modified so that, for example, the activity of ribonuclease III is deleted (eliminated). It is expected that, by modifying a microorganism so that the activity of ribonuclease III is reduced, the objective RNA-producing ability of the microorganism can be improved, and that is, production of the objective RNA by using the microorganism can be increased.

Hereinafter, ribonuclease III and a gene encoding it will be explained.

The term "ribonuclease III" refers to a protein that has an activity of catalyzing the reaction of cleaving specific RNA such as double-stranded RNA (EC 3.1.26.3). This activity is also referred to as "ribonuclease III activity". A gene encoding ribonuclease III is also referred to as "ribonuclease III gene".

Examples of the ribonuclease III gene include rnc gene. A protein (ribonuclease III) encoded by rnc gene is also referred to as "Rnc protein".

The nucleotide sequences of ribonuclease III genes, such as rnc genes, possessed by microorganisms and the amino acid sequences of ribonucleases III encoded by these genes, such as Rnc proteins, can be obtained from, for example, public databases such as NCBI (National Center for Biotechnology Information). The nucleotide sequence of the rnc gene of the *C. glutamicum* ATCC 13869 strain and the amino acid sequence of the Rnc protein encoded by the gene are shown in SEQ ID NOS: 30 and 31, respectively. That is, the ribonuclease III gene may be, for example, a gene having the nucleotide sequence of any of the ribonuclease III genes exemplified above (e.g. the nucleotide sequence shown as SEQ ID NO: 30). Also, ribonuclease III may be, for example, a protein having the amino acid sequence of any of the ribonucleases III exemplified above (e.g. the amino acid sequence shown as SEQ ID NO: 31). The expression "having a (nucleotide or amino acid) sequence" means comprising the (nucleotide or amino acid) sequence unless otherwise stated, and also includes cases of consisting of the (nucleotide or amino acid) sequence.

The ribonuclease III gene may be a variant of any of the ribonuclease III genes exemplified above (e.g. a gene having the nucleotide sequence shown as SEQ ID NO: 30), so long as the original function is maintained. Similarly, ribonuclease III may be a variant of any of the ribonucleases III exemplified above (e.g. a protein having the amino acid sequence shown as SEQ ID NO: 31), so long as the original function is maintained. Such a variant that maintains the original function is also referred to as "conservative variant". The term "rnc gene" includes not only the rnc genes exemplified above, but also includes conservative variants thereof. Similarly, the term "Rnc protein" includes not only the Rnc proteins exemplified above, but also includes conservative variants thereof. Examples of the conservative variants include, for example, homologues and artificially modified versions of the ribonuclease III genes and ribonucleases III exemplified above.

The expression "the original function is maintained" means that a variant of gene or protein has a function, such as activity or property, corresponding to the function, such as activity or property, of the original gene or protein. That is, the expression "the original function is maintained" used for the ribonuclease III gene means that a variant of the gene encodes a protein that maintains the original function, for example, a protein having ribonuclease III activity. Furthermore, the expression "the original function is maintained" used for ribonuclease III means that a variant of the protein has ribonuclease III activity.

Ribonuclease III activity can be measured by, for example, incubating the enzyme with RNA that serves as a substrate thereof (e.g. double-stranded RNA), and measuring the enzyme-dependent cleavage of the RNA. Specifically, ribonuclease III activity is generally measured in the following manner (Methods Enzymol. 2001; 342:143-58.).

One method is a method of adding an enzyme, such as a crude extract from cells, such as microbial cells or a partially purified enzyme thereof, to a synthetic substrate of $^3$H-labeled poly (A-U) in a double-stranded form to react them at 35° C., treating the reaction mixture with trichloroacetic acid, and measuring the degree of the reaction-time-dependent decrease in radioactivity in the precipitate fraction, which contains high-molecular-weight nucleotides. That is, ribonuclease III activity can be calculated on the basis of the degree of the decrease in radioactivity as an indicator of cleavage of the substrate. In addition, another method is a method of adding $^{32}$P-radiolabeled double-stranded RNA as a substrate to a reaction mixture containing an enzyme (30 mM Tris-HCl (pH8.0), 250 mM potassium glutamate or 160 mM NaCl, 5 mM spermidine, 0.1 mM EDTA, and 0.1 mM DTT), incubating at 37° C. for 5 min, adding thereto $MgCl_2$ at a final concentration of 10 mM to initiate the RNA cleavage reaction, and adding thereto, after appropriate proceeding of the reaction, an equal volume of a mixture of EDTA and electrophoresis marker dye, of which the EDTA concentration is one providing a final concentration of 20 mM or more, to stop the reaction. Then, ribonuclease III activity can be detected by applying samples after the reaction to electrophoresis using a denaturing 15% (w/v) polyacrylamide gel with TBE buffer (89 mM Tris/Trisborate, and 2 mM EDTA) containing 7 M urea, and applying the gel to a radiation imaging analyzer to analyze cleaved RNA fragments.

Hereinafter, examples of the conservative variants will be explained.

Homologues of the ribonuclease III gene or homologues of ribonuclease III can be easily obtained from public databases by, for example, BLAST search or FASTA search using the nucleotide sequence of any of the ribonuclease III genes exemplified above or the amino acid sequence of any of the ribonucleases III exemplified above as a query sequence. Furthermore, homologues of the ribonuclease III gene can be obtained by, for example, PCR using the chromosome of a microorganism such as a coryneform bacterium as the template, and oligonucleotides prepared on the basis of the nucleotide sequence of any of these known ribonuclease III genes and adjacent regions thereof as primers.

The ribonuclease III gene may be a gene encoding a protein having the amino acid sequence of any of the ribonucleases III exemplified above, (e.g. the amino acid sequence shown as SEQ ID NO: 31), but which includes substitution, deletion, insertion, and/or addition of one or several amino acid residues at one or several positions, so long as the original function is maintained. Although the number meant by the term "one or several" mentioned above may differ depending on the positions of amino acid residues in the three-dimensional structure of the protein or the types of amino acid residues, specifically, it is, for example, 1 to 50, 1 to 40, or 1 to 30, 1 to 20, 1 to 10, 1 to 5, or 1 to 3.

The aforementioned substitution, deletion, insertion, and/or addition of one or several amino acid residues are/is a conservative mutation that maintains the normal function of the protein. Typical examples of the conservative mutation are conservative substitutions. The conservative substitution is a mutation wherein substitution takes place mutually among Phe, Trp, and Tyr, if the substitution site is an aromatic amino acid; among Leu, Ile, and Val, if it is a hydrophobic amino acid; between Gln and Asn, if it is a polar amino acid; among Lys, Arg, and His, if it is a basic amino acid; between Asp and Glu, if it is an acidic amino acid; and between Ser and Thr, if it is an amino acid having a hydroxyl group. Examples of substitutions considered as conservative substitutions include, specifically, substitution of Ser or Thr for Ala, substitution of Gln, His, or Lys for Arg, substitution of Glu, Gln, Lys, His, or Asp for Asn, substitution of Asn, Glu, or Gln for Asp, substitution of Ser or Ala for Cys, substitution of Asn, Glu, Lys, His, Asp, or Arg for Gln, substitution of Gly, Asn, Gln, Lys, or Asp for Glu, substitution of Pro for Gly, substitution of Asn, Lys, Gln, Arg, or Tyr for His, substitution of Leu, Met, Val, or Phe for Ile, substitution of Ile, Met, Val, or Phe for Leu, substitution of Asn, Glu, Gln, His, or Arg for Lys, substitution of Ile, Leu, Val, or Phe for Met, substitution of Trp, Tyr, Met, Ile, or Leu for Phe, substitution of Thr or Ala for Ser, substitution of Ser or Ala for Thr, substitution of Phe or Tyr for Trp, substitution of His, Phe, or Trp for Tyr, and substitution of Met, Ile, or Leu for Val. Furthermore, such substitution, deletion, insertion, or addition of amino acid residues as mentioned above includes a naturally occurring mutation due to an individual difference, or a difference of species of the microorganism from which the gene is derived (mutant or variant).

The ribonuclease III gene may be a gene encoding a protein having an amino acid sequence showing a homology of, for example, 80% or more, 90% or more, 95% or more, 97% or more, or 99% or more, to the total amino acid sequence of any of the ribonucleases III exemplified above (e.g. the amino acid sequence shown as SEQ ID NO: 31), so long as the original function is maintained. In this description, "homology" means "identity".

The ribonucleases III gene may also be a DNA that is able to hybridize under stringent conditions with a complementary sequence of the nucleotide sequence of any of the ribonucleases III genes exemplified above (e.g. the nucleotide sequence shown as SEQ ID NO: 30) or a probe that can be prepared from the complementary sequence, so long as the original function is maintained. The term "stringent conditions" refers to conditions under which a so-called specific hybrid is formed, and a non-specific hybrid is not formed. Examples of the stringent conditions include those under which highly homologous DNAs hybridize to each other, for example, DNAs not less than 80% homologous, not less than 90% homologous, not less than 95% homologous, not less than 97% homologous, or not less than 99% homologous, hybridize to each other, and DNAs less homologous than the above do not hybridize to each other, or conditions of washing of typical Southern hybridization, i.e., conditions of washing once, preferably 2 or 3 times, at a salt concentration and temperature corresponding to 1×SSC, 0.1% SDS at 60° C., 0.1×SSC, 0.1% SDS at 60° C., or 0.1×SSC, 0.1% SDS at 68° C.

The probe may be, for example, a part of a complementary sequence of the gene. Such a probe can be prepared by PCR using oligonucleotides prepared on the basis of a known gene sequence as primers and a DNA fragment containing any of these nucleotide sequences as a template. As the probe, for example, a DNA fragment having a length of about 300 bp can be used. In such a case, the washing conditions of the hybridization may be, for example, 50° C., 2×SSC and 0.1% SDS.

Furthermore, since the degeneracy of codons differs depending on the host, arbitrary codons in the ribonucleases III gene may be replaced with respective equivalent codons. That is, the ribonucleases III gene may be a variant of any of the ribonucleases III genes exemplified above due to the degeneracy of the genetic code.

The percentage of the sequence identity between two sequences can be determined by, for example, using a mathematical algorithm. Non-limiting examples of such a mathematical algorithm include the algorithm of Myers and Miller (1988) CABIOS 4:11-17, the local homology algorithm of Smith et al (1981) Adv. Appl. Math. 2:482, the homology alignment algorithm of Needleman and Wunsch (1970) J. Mol. Biol. 48:443-453, the method for searching homology of Pearson and Lipman (1988) Proc. Natl. Acad. Sci. 85:2444-2448, and an modified version of the algorithm of Karlin and Altschul (1990) Proc. Natl. Acad. Sci. USA 87:2264, such as one described in Karlin and Altschul (1993) Proc. Natl. Acad. Sci. USA 90:5873-5877.

By using a program based on such a mathematical algorithm, sequence comparison (i.e. alignment) for determining the sequence identity can be performed. The program can be appropriately executed by a computer. Examples of such a program include, but not limited to, CLUSTAL of PC/Gene program (available from Intelligenetics, Mountain View, Calif.), ALIGN program (Version 2.0), and GAP, BESTFIT, BLAST, FASTA, and TFASTA of Wisconsin Genetics Software Package, Version 8 (available from Genetics Computer Group (GCG), 575 Science Drive, Madison, Wis., USA). Alignment using these programs can be performed by using, for example, initial parameters. The CLUSTAL program is well described in Higgins et al. (1988) Gene 73:237-244, Higgins et al. (1989) CABIOS 5:151-153, Corpet et al. (1988) Nucleic Acids Res. 16:10881-90, Huang et al. (1992) CABIOS 8:155-65, and Pearson et al. (1994) Meth. Mol. Biol. 24:307-331.

In order to obtain a nucleotide sequence homologous to a target nucleotide sequence, in particular, for example, BLAST nucleotide search can be performed by using BLASTN program with score of 100 and word length of 12. In order to obtain an amino acid sequence homologous to a target protein, in particular, for example, BLAST protein search can be performed by using BLASTX program with score of 50 and word length of 3. See ncbi.nlm.nih.gov for BLAST nucleotide search and BLAST protein search. In addition, Gapped BLAST (BLAST 2.0) can be used in order to obtain an alignment including gap(s) for the purpose of comparison. In addition, PSI-BLAST (BLAST 2.0) can be used in order to perform repetitive search for detecting distant relationships between sequences. See Altschul et al. (1997) Nucleic Acids Res. 25:3389 for Gapped BLAST and PSI-BLAST. When using BLAST, Gapped BLAST, or PSI-BLAST, initial parameters of each program (e.g. BLASTN for nucleotide sequences, and BLASTX for amino acid sequences) can be used. Alignment can also be manually performed.

The sequence identity between two sequences is calculated as the ratio of residues matching in the two sequences when aligning the two sequences so as to fit maximally with each other. The term "identity" between amino acid sequences may mean an identity calculated by blastp with default scoring parameters (i.e. Matrix, BLOSUM62; Gap Costs, Existence=11, Extension=1; Compositional Adjustments, Conditional compositional score matrix adjustment), unless otherwise stated. The term "identity" between nucleotide sequences may mean an identity calculated by blastn with default scoring parameters (i.e. Match/Mismatch Scores=1, -2; Gap Costs=Linear), unless otherwise stated.

The aforementioned descriptions concerning variants of the genes and proteins can be similarly applied to variants of other arbitrary proteins and the objective RNA, and genes encoding them.

Hereinafter, methods for reducing the activity of a protein (enzyme) such as ribonucleases III will be explained.

The expression "the activity of a protein is reduced" means that the activity of the protein is reduced as compared with a non-modified strain. Specifically, the expression "the activity of a protein is reduced" means that the activity of the protein per cell is reduced as compared with that of a non-modified strain. The term "non-modified strain" used herein refers to a control strain that has not been modified so that the activity of an objective protein is reduced. Examples of the non-modified strain include a wild-type strain and parent strain. Specific examples of the non-modified strain include the respective type strains of the species of microorganisms. Specific examples of the non-modified strain also include strains exemplified above in relation to the description of microorganisms. That is, in an embodiment, the activity of a protein may be reduced as compared with a type strain, i.e. the type strain of the species to which the microorganism as described herein belongs. In another embodiment, the activity of a protein may also be reduced as compared with the C. glutamicum ATCC 13032 strain. In another embodiment, the activity of a protein may also be reduced as compared with the C. glutamicum 2256 strain (ATCC 13869). The phrase that "the activity of a protein is reduced" also includes when the activity of the protein has completely disappeared. More specifically, the expression "the activity of a protein is reduced" may mean that the number of molecules of the protein per cell is reduced, and/or the function of each molecule of the protein is reduced as compared with those of a non-modified strain. That is, the term "activity" in the expression "the activity of a protein is reduced" is not limited to the catalytic activity of the protein, but may also mean the transcription amount of a gene (i.e. the amount of mRNA) encoding the protein or the translation amount of the protein (i.e. the amount of the protein). The state that "the number of molecules of the protein per cell is reduced" also includes a state that the protein does not exist at all. The state that "the function of each molecule of the protein is reduced" also includes a state that the function of each protein molecule has completely disappeared. The degree of the reduction in the activity of a protein is not particularly limited, so long as the activity is reduced as compared with that of a non-modified strain. The activity of a protein may be reduced to, for example, 50% or less, 20% or less, 10% or less, 5% or less, or 0% of that of a non-modified strain.

The modification for reducing the activity of a protein can be attained by, for example, reducing the expression of a gene encoding the protein. The expression "the expression of a gene is reduced" means that the expression of the gene is reduced as compared with a non-modified strain such as a wild-type strain and parent strain. Specifically, the expression "the expression of a gene is reduced" means that the expression of the gene per cell is reduced as compared with that of a non-modified strain. More specifically, the expression "the expression of a gene is reduced" may mean that the transcription amount of the gene (i.e. the amount of mRNA) is reduced, and/or the translation amount of the gene (i.e. the amount of the protein expressed from the gene) is reduced. The state that "the expression of a gene is reduced" also includes a state that the gene is not expressed at all. The state that "the expression of a gene is reduced" is also referred to as "the expression of a gene is attenuated". The expression of a gene may be reduced to, for example, 50% or less, 20% or less, 10% or less, 5% or less, or 0% of that of a non-modified strain.

The reduction in gene expression may be due to, for example, a reduction in the transcription efficiency, a reduction in the translation efficiency, or a combination of them. The expression of a gene can be reduced by modifying an expression control sequence of the gene such as a promoter, a Shine-Dalgarno (SD) sequence, also referred to as ribosome-binding site (RBS), and a spacer region between RBS and the start codon of the gene. When an expression control sequence is modified, one or more nucleotides, two or more nucleotides, or three or more nucleotides, of the expression control sequence are modified. For example, the transcription efficiency of a gene can be reduced by, for example, replacing the promoter of the gene on a chromosome with a weaker promoter. The term "weaker promoter" means a promoter providing an attenuated transcription of a gene compared with an inherent wild-type promoter of the gene. Examples of weaker promoters include, for example, inducible promoters. That is, an inducible promoter may function as a weaker promoter under a non-induced condition, such as in the absence of the corresponding inducer. Furthermore, a portion or the entire expression control sequence may be deleted. The expression of a gene can also be reduced by, for example, manipulating a factor responsible for expression control. Examples of the factor responsible for expression control include low molecules responsible for transcription or translation control (inducers, inhibitors, etc.), proteins responsible for transcription or translation control (transcription factors etc.), nucleic acids responsible for transcription or translation control (siRNA etc.), and so forth. Furthermore, the expression of a gene can also be reduced by, for example, introducing a mutation that reduces the expression of the gene into the coding region of the gene. For example, the expression of a gene can be reduced by replacing a codon in the coding region of the gene with a synonymous codon used less frequently in a host. Furthermore, for example, the gene expression may be reduced due to disruption of a gene as described later.

The modification for reducing the activity of a protein can also be attained by, for example, disrupting a gene encoding the protein. The expression "a gene is disrupted" means that a gene is modified so that a protein that can normally function is not produced. The phrase that "a protein that normally functions is not produced" includes when the protein is not produced at all from the gene, and when the protein of which the function, such as activity or property, per molecule is reduced or eliminated is produced from the gene.

Disruption of a gene can be attained by, for example, deleting the gene on a chromosome. The term "deletion of a gene" refers to deletion of a portion or the entire coding region of the gene. Furthermore, the entire gene including sequences upstream and downstream from the coding region of the gene on a chromosome may be deleted. The sequences upstream and downstream from the coding region of a gene may contain, for example, an expression control sequence of the gene. The region to be deleted may be any region such as an N-terminal region, such as a region encoding an N-terminal region of a protein, an internal region, or a C-terminal region, such as a region encoding a C-terminal region of a protein, so long as the activity of the protein can be reduced. Deletion of a longer region can usually more surely inactivate the gene. The region to be deleted may be, for example, a region having a length of 10% or more, 20% or more, 30% or more, 40% or more, 50% or more, 60% or more, 70% or more, 80% or more, 90% or more, or 95% or more of the total length of the coding region of the gene. Furthermore, it is preferred that the reading frames of the sequences upstream and downstream from the region to be deleted are not the same. Inconsistency of reading frames may cause a frameshift downstream of the region to be deleted.

Disruption of a gene can also be attained by, for example, introducing a mutation for an amino acid substitution (missense mutation), a stop codon (nonsense mutation), addition or deletion of one or two nucleotide residues (frame shift mutation), or the like into the coding region of the gene on a chromosome (Journal of Biological Chemistry, 272:8611-8617 (1997); Proceedings of the National Academy of Sciences, USA, 95 5511-5515 (1998); Journal of Biological Chemistry, 26 116, 20833-20839 (1991)).

Disruption of a gene can also be attained by, for example, inserting another nucleotide sequence into a coding region of the gene on a chromosome. Site of the insertion may be in any region of the gene, and insertion of a longer nucleotide sequence can usually more surely inactivate the gene. It is preferred that reading frames of the sequences upstream and downstream from the insertion site are not the same. Inconsistency of reading frames may cause a frameshift downstream of the insertion site. The other nucleotide sequence is not particularly limited so long as a sequence that reduces or eliminates the activity of the encoded protein is chosen, and examples thereof include, for example, a marker gene such as antibiotic resistance genes, and a gene useful for production of an objective substance.

Particularly, disruption of a gene may be carried out so that the amino acid sequence of the encoded protein is deleted. In other words, the modification for reducing the activity of a protein can be attained by, for example, deleting the amino acid sequence, such as a portion or the entire amino acid sequence of the protein, specifically, modifying a gene so as to encode a protein of which the amino acid sequence, such as a portion or the entire amino acid sequence is deleted. The term "deletion of the amino acid sequence of a protein" refers to deletion of a portion or the entire amino acid sequence of the protein. In addition, the term "deletion of the amino acid sequence of a protein" means that the original amino acid sequence disappears in the protein, and also includes when the original amino acid sequence is changed to another amino acid sequence. That is, for example, a region that was changed to another amino acid sequence by frameshift may be regarded as a deleted region. When the amino acid sequence is deleted, the total length of a protein is typically shortened, but there can also be cases where the total length of the protein is not changed or is extended. For example, by deletion of a portion or the entire coding region of a gene, a region encoded by the deleted region can be deleted in the amino acid sequence of the encoded protein. In addition, for example, by introduction of a stop codon into the coding region of a gene, a region encoded by the downstream region of the introduction site can be deleted in the amino acid sequence of the encoded protein. In addition, for example, by frameshift in the coding region of a gene, a region encoded by the frameshift region can be deleted. The aforementioned descriptions concerning the position and length of the region to be deleted in deletion of a gene can be similarly applied to the position and length of the region to be deleted in deletion of the amino acid sequence of a protein.

Such modification of a gene on a chromosome as described above can be attained by, for example, preparing a disruption-type gene modified so that it is unable to produce a protein that normally functions, and transforming a host with a recombinant DNA containing the disruption-type gene to cause homologous recombination between the disruption-type gene and the wild-type gene on a chromosome and thereby substitute the disruption-type gene for the wild-type gene on the chromosome. In this procedure, if a marker gene selected according to the characteristics of the host such as auxotrophy is included in the recombinant DNA, the operation becomes easier. Examples of the disruption-type gene include a gene in which a portion or the entire coding region is deleted, gene including a missense mutation, gene including a nonsense mutation, gene including a frame shift mutation, and gene introduced with an insertion sequence such as a transposon or marker gene. The structure of the recombinant DNA to be used for homologous recombination is not particularly limited as long as it causes homologous recombination in a desired manner. For example, a host can be transformed with a linear DNA containing a disruption-type gene and further containing upstream and downstream sequences of a wild-type gene on the chromosome at the respective ends, so that homologous recombination occurs at each of upstream and downstream sides of the wild-type gene, to thereby replace the wild-type gene with the disruption-type gene in one step. The protein encoded by the disruption-type gene has a conformation different from that of the wild-type protein, even if it is produced, and thus the function thereof is reduced or eliminated. Such gene disruption based on gene substitution utilizing homologous recombination has already been established, and there are methods of using a linear DNA such as a method called "Red driven integration" (Datsenko, K. A, and Wanner, B. L., Proc. Natl. Acad. Sci. USA, 97:6640-6645 (2000)), and a method utilizing the Red driven integration in combination with an excision system derived from λ phage (Cho, E. H., Gumport, R. I., Gardner, J. F., J. Bacteriol., 184:5200-5203 (2002)) (refer to WO2005/010175), a method of using a plasmid having a temperature sensitive replication origin, a method of using a plasmid capable of conjugative transfer, a method of utilizing a suicide vector not having a replication origin that functions in a host (U.S. Pat. No. 6,303,383, Japanese Patent Laid-open (Kokai) No. 05-007491), and so forth.

Modification for reducing activity of a protein can also be attained by, for example, a mutagenesis treatment. Examples of the mutagenesis treatment include irradiation of X-ray or ultraviolet and treatment with a mutation agent such as N-methyl-N'-nitro-N-nitrosoguanidine (MNNG), ethyl methanesulfonate (EMS), and methyl methanesulfonate (MMS).

When a protein functions as a complex consisting of a plurality of subunits, some or all of the subunits may be modified, so long as the activity of the protein is eventually reduced. That is, for example, some or all of of the genes that encode the respective subunits may be disrupted or the like. Furthermore, when there is a plurality of isozymes of a protein, a part or all of the activities of the plurality of isozymes may be reduced, so long as the activity of the protein is eventually reduced. That is, for example, some or all of the genes that encode the respective isozymes may be disrupted or the like.

Such methods for reducing the activity of a protein as mentioned above may be used independently or in an arbitrary combination.

A reduction in the activity of a protein can be confirmed by measuring the activity of the protein.

A reduction in the activity of a protein can also be confirmed by confirming a reduction in the expression of a gene encoding the protein. A reduction in the expression of a gene can be confirmed by confirming a reduction in the transcription amount of the gene or a reduction in the amount of the protein expressed from the gene.

A reduction in the transcription amount of a gene can be confirmed by comparing the amount of mRNA transcribed from the gene with that of a non-modified strain. Examples of the method for evaluating the amount of mRNA include Northern hybridization, RT-PCR, microarray, RNA-Seq, and so forth (Sambrook, J., et al., Molecular Cloning: A Laboratory Manual/Third Edition, Cold Spring Harbor Laboratory Press, Cold Spring Harbor (USA), 2001). The amount of mRNA, such as the number of molecules of the mRNA per cell, is preferably reduced to, for example, 50% or less, 20% or less, 10% or less, 5% or less, or 0% of that of a non-modified strain.

A reduction in the amount of a protein can be confirmed by Western blotting using antibodies (Sambrook, J., et al., Molecular Cloning: A Laboratory Manual/Third Edition, Cold Spring Harbor Laboratory Press, Cold Spring Harbor (USA) 2001). The amount of the protein, such as the number of molecules of the protein per cell, can be reduced to, for example, 50% or less, 20% or less, 10% or less, 5% or less, or 0% of that of a non-modified strain.

Disruption of a gene can be confirmed by determining the nucleotide sequence of a portion or the entire gene, restriction enzyme map, full length, or the like of the gene depending on the means used for the disruption.

The aforementioned methods for reducing the activity of a protein can be applied to reduction in the activities of arbitrary proteins and reduction in the expression of arbitrary genes, as well as reduction in ribonucleases III activity.

<2-2> Preparation of Active Ingredient

<2-2-1> Culturing

By culturing the microorganism, cells of the microorganism can be obtained.

The microorganism can be cultured according to, for example, culture conditions usually used for culturing microorganisms such as bacteria. The microorganism can be cultured in, for example, a usual medium containing a carbon source, a nitrogen source, and inorganic ions. In addition, for example, organic micronutrients such as vitamins and amino acids can also be added as required.

As the carbon source, for example, carbohydrates such as glucose and sucrose, organic acids such as acetic acid, alcohols, and others can be used. As the nitrogen source, for example, ammonia gas, aqueous ammonia, ammonium salts, and others can be used. As the inorganic ions, for example, calcium ions, magnesium ions, phosphate ions, potassium ions, iron ions, and so forth can be appropriately used as required. The culture can be performed within appropriate ranges of pH 5.0 to 8.5 and 15 to 37° C. under aerobic conditions for 10 to 120 hours. Furthermore, culture conditions for L-amino acid production using microorganisms such as bacteria and culture conditions for methods of secretory production of a protein using microorganisms such as bacteria can be referred to (WO01/23591, WO2005/103278, WO2013/065869, WO2013/065772, WO2013/118544, WO2013/062029, etc.). Furthermore, when an inducible promoter is used for expression of the objective RNA, the expression of the objective RNA can be appropriately induced.

By culturing the microorganism under such conditions, the objective RNA is transcribed and accumulated in cells of the microorganism, that is, cells containing the objective RNA can be obtained.

The expression and accumulation of the objective RNA can be confirmed by, for example, applying a fraction containing a cell extract as a sample to electrophoresis, and detecting a band corresponding to the molecular weight of the objective RNA.

<2-2-2> Organic Solvent Treatment

By subjecting the cells of the microorganism to the organic solvent treatment, the active ingredient, that is, the dead cells) can be obtained.

Specifically, for example, by subjecting the cells of the microorganism to the organic solvent treatment, the cells can be sterilized, and thereby the active ingredient can be obtained. That is, the cells to be subject to the organic solvent treatment may be viable cells. The degree of the sterilization of cells is not particularly limited, so long as it is within an acceptable range according to the use purpose of the active ingredient. The organic solvent treatment can be carried out so that, for example, the cell viability rate is $1 \times 10^{-5}$ or lower, $1 \times 10^{-6}$ or lower, $1 \times 10^{-7}$ or lower, or $1 \times 10^{-8}$ or lower. The phrase "cell viability rate" refer to ratio of the viable cell count after the organic solvent treatment based on the viable cell count before the organic solvent treatment. The phrase "before the organic solvent treatment" is not particularly limited, so long as it refers to a timepoint before the organic solvent treatment is carried out and before the cells of the microorganism are sterilized. The phrase "before the organic solvent treatment" may refer to, specifically, for example, the starting time of the organic solvent treatment. Sterilization of the cells can be confirmed by, for example, subjecting a reaction mixture after the organic solvent treatment to culturing. Sterilization of the cells can be confirmed by, specifically, for example, inoculating a reaction mixture after the organic solvent treatment to a solid medium, and confirming the presence or absence or the degree of colony formation. That is, the viable cell count can be measured as, for example, colony forming unit (CFU).

The cells may be subject to the organic solvent treatment while being present in the culture broth, or after being collected from the culture broth. The cells may also be subject to the organic solvent treatment after being subject to a treatment such as concentration, dilution, washing, and suspension as required. These treatments are not particularly limited, so long as the RNA silencing-inducing effect is not spoiled. These treatments may be independently carried out, or may be carried out in an appropriate combination. That is, examples of the cells to be subject to the organic solvent treatment include a culture broth containing cells, cells collected from the culture broth, and a processed product thereof. Cells in these forms may be independently used, or may be used in an appropriate combination.

Methods for collecting the cells from the culture broth are not particularly limited, and for example, known methods can be used. Examples of such methods include, for example, spontaneous precipitation, centrifugation, and filtration. A flocculant may also be used. These methods may be independently used, or may be used in an appropriate combination. The collected cells can be washed as required by using an appropriate medium. The collected cells can be re-suspended as required by using an appropriate medium. Examples of the medium that can be used for washing or suspending the cells include, for example, aqueous media (aqueous solvents) such as water and aqueous buffer.

The organic solvent treatment can be carried out by bringing the cells and an organic solvent into contact with each other. A system in which the organic solvent treatment is carried out, such as a suspension containing the cells and the organic solvent, is also referred to as "reaction mixture". The conditions of the organic solvent treatment, such as the type and concentration of the organic solvent, the concentration of the cells, the period of the organic solvent treatment, the temperature of the organic solvent treatment, and the pH of the organic solvent treatment, are not particularly limited, so long as the RNA silencing-inducing effect is not spoiled and the cells can be sterilized.

As the organic solvent, one or more having the ability to sterilize the microorganism can be appropriately chosen. Examples of the organic solvent include alcohols, ethers, esters, aldehydes, ketones, alkanes, and phenols. Examples of alcohol include ethanol and methanol. As the organic solvent, a single kind of organic solvent may be used, or two or more kinds of organic solvents may be used in combination. The concentration of the organic solvent in the reaction mixture, for example, may be 30% (v/v) or higher, 40% (v/v) or higher, 50% (v/v) or higher, 60% (v/v) or higher, 70% (v/v) or higher, 80% (v/v) or higher, 90% (v/v) or higher, or 95% (v/v) or higher, may be 99% (v/v) or lower, 97% (v/v) or lower, 95% (v/v) or lower, 90% (v/v) or lower, 80% (v/v) or lower, 70% (v/v) or lower, 60% (v/v) or lower, or 50% (v/v) or lower, or may be within a range defined as a non-contradictory combination thereof. The concentration of the organic solvent in the reaction mixture may be, specifically, for example, 30% (v/v) to 99% (v/v), 40% (v/v) to 99% (v/v), or 50% (v/v) to 99% (v/v). When the organic solvent is ethanol, the concentration of the organic solvent in the reaction mixture may be, for example, 30% (v/v) or higher, or particularly 50% (v/v) or higher. When the organic solvent is methanol, the concentration of the organic solvent in the reaction mixture may be, for example, 50% (v/v) or higher, or particularly 70% (v/v) or higher.

The concentration of the cells in the reaction mixture, for example, the concentration of the viable cells in the reaction mixture at the start of the organic solvent treatment, for example, may be $1\times10^6$ cells/mL or higher, $1\times10^7$ cells/mL or higher, $1\times10^8$ cells/mL or higher, $1\times10^9$ cells/mL or higher, or $1\times10^{10}$ cells/mL or higher, may be $1\times10^{12}$ cells/mL or lower, $1\times10^{11}$ cells/mL or lower, $1\times10^1$ cells/mL or lower, $1\times10^9$ cells/mL or lower, or $1\times10^8$ cells/mL or lower, or may be within a range defined as a non-contradictory combination thereof. The concentration of the cells in the reaction mixture, for example, the concentration of the viable cells in the reaction mixture at the start of the organic solvent treatment may be, specifically, for example, $1\times10^7$ cells/mL to $1\times10^{11}$ cells/mL.

The reaction mixture may consist of the cells and the organic solvent, or may contain another ingredient. Examples of the other ingredient include aqueous media (aqueous solvents) such as water and aqueous buffer.

The period of the organic solvent treatment, for example, may be 1 minute or longer, 2 minutes or longer, 3 minutes or longer, 5 minutes or longer, 10 minutes or longer, or 20 minutes or longer, may be 2 hours or shorter, 1 hour or shorter, 30 minutes or shorter, 20 minutes or shorter, 10 minutes or shorter, or 5 minutes or shorter, or may be within a range defined as a non-contradictory combination thereof. The period of the organic solvent treatment may be, specifically, for example, 1 minute to 20 minutes. The temperature of the organic solvent treatment, for example, may be 10° C. or higher, 20° C. or higher, or 30° C. or higher, may be 50° C. or lower, 40° C. or lower, 30° C. or lower, or 20° C. or lower, or may be within a range defined as a non-contradictory combination thereof. The temperature of the organic solvent treatment may be, specifically, for example, 20° C. to 30° C. The temperature of the organic solvent treatment may be, typically, a room temperature. The pH of the organic solvent treatment may be, for example, 5 to 9, or 6 to 8. The organic solvent treatment may be carried out under static conditions, or may be carried out under stirring or shaking conditions. The conditions of the organic solvent treatment may be or may not be constant from the start to the completion of the organic solvent treatment.

By carrying out the organic solvent treatment as described above, the active ingredient, that is, the dead cells can be obtained.

The dead cells may be used for RNA silencing while being present in the reaction mixture, or after being collected from the reaction mixture. The dead cells may also be used for RNA silencing after being subjected to a treatment such as concentration, dilution, washing, and suspension as required. These treatments are not particularly limited, so long as the RNA silencing-inducing effect is not spoiled. These treatments may be independently carried out, or may be carried out in an appropriate combination. That is, examples of the dead cells include a reaction mixture containing dead cells, dead cells collected from the reaction mixture, and a processed product thereof. Dead cells in these forms may be independently used, or may be used in an appropriate combination. Collection and treatment of the dead cells can be carried out in the same manner as collection and treatment of the cells to be subject to the organic solvent treatment. The dead cells may be, for example, collected, washed, re-suspended, and then used for RNA silencing. The dead cells may be, specifically, for example, prepared as a composition, and then used for RNA silencing.

<3> Composition

The composition is a composition containing the active ingredient (i.e. the dead cells).

The composition can be used by allowing a target organism to ingest the composition. The use mode of the composition will be described in detail in "the method" section herein. By using the composition, specifically by allowing a target organism to ingest the composition, RNA silencing can be induced in the target organism, that is, the RNA silencing-inducing effect can be obtained. That is, the composition may be a composition for inducing RNA silencing in the target organism. A composition for inducing RNA silencing is also referred to as "RNA silencing inducer". In one aspect, activity of the target organism can be suppressed by RNA silencing. That is, one aspect of the composition for inducing RNA silencing may be a composition for suppressing activity of the target organism. A composition for suppressing activity of the target organism is also referred to as "activity suppressor of the target organism". In addition, in one aspect, the target organism can be eliminated by RNA silencing. That is, one aspect of the composition for inducing RNA silencing may be a composition for eliminating the target organism. A composition for eliminating the target organism is also referred to as "eliminator of the target organism". In addition, in one aspect, the harm caused by the target organism can be prevented by RNA silencing. That is, one aspect of the composition for inducing RNA silencing may be a composition for preventing the harm caused by the target organism. A composition for preventing the harm caused by the target organism is also referred to as "control agent of the harm caused by the target organism".

The composition may consist of only the active ingredient, or may contain one or more ingredients other than the active ingredient.

The one or more ingredients other than the active ingredient is not particularly limited, so long as the RNA silencing-inducing effect is not spoiled. As the ingredient other than the active ingredient, those acceptable according to the intended purpose of the composition can be used. Examples of the ingredient other than the active ingredient include ingredients usually used for such a purpose as agricultural chemicals, fertilizers, feeds, and pharmaceuticals. Specific examples of such ingredients include, for example, additives such as excipients, binders, disintegrants, lubricants, stabilizers, diluents, surfactants, spreading agents, pH adjusters, water, alcohols, vitamins, and minerals. Examples of the ingredient other than the active ingredient also include ingredients used in the culturing step and treatment step. As the ingredient other than the active ingredient, a single kind of ingredient may be used, or two or more kinds of ingredients may be used in combination.

The form of the composition is not particularly limited. The composition may be in any form, such as the form of powder, granule, liquid, paste, or cube. The composition may be provided in a form that can be ingested as it is by the target organism, or may be prepared to a form that can be ingested by the target organism prior to use. The composition may be constituted as, for example, a feed for the target organism. The composition may also be constituted as, for example, an agricultural chemical.

The amounts and the ratios of the ingredients, namely, the active ingredient and other optional ingredient(s), present in the composition are not particularly limited, so long as the RNA silencing-inducing effect can be obtained. The amounts and the ratios of the ingredients present in the composition can be appropriately chosen depending on various conditions such as the mode of the active ingredient, the type of the other ingredient(s), the type of the target organism, and the intended use of the composition.

The amount of the active ingredient present in the composition, for example, may be 0.01% (w/w) or higher, 0.1% (w/w) or higher, 1% (w/w) or higher, 5% (w/w) or higher, or 10% (w/w) or higher, may be 100% (w/w) or lower, 99.9% (w/w) or lower, 70% (w/w) or lower, 50% (w/w) or lower, 30% (w/w) or lower, 10% (w/w) or lower, 5% (w/w) or lower, or 1% (w/w) or lower, or may be within a range defined as a non-contradictory combination thereof, in terms of the amount based on the dry cell weight or the wet cell weight.

Furthermore, the amount of the active ingredient present in the composition may also be, for example, such an amount that the amount of the active ingredient ingested by the target organism is within a desired range. Specifically, the amount of the active ingredient present in the composition may be, for example, such an amount that the amount of the active ingredient ingested by the target organism is within a desired range when the target organism is allowed to ingest the active ingredient by using the composition. The amount of the active ingredient ingested by the target organism may be, for example, within the range described below.

When the composition contains two or more kinds of ingredients, the ingredients may be present in the composition as a mixture, or may be separately added to the composition as respective ingredients or any combination of the ingredients.

The composition can be obtained by producing the active ingredient. That is, a method is provided for producing the composition, including a step of producing the active ingredient. The descriptions concerning the method for producing the active ingredient can be applied similarly to the step of producing the active ingredient. That is, the method for producing the active ingredient may also be read as the method for producing the composition as it is.

<4> Method

The method includes allowing the target organism to ingest the active ingredient, that is, the dead cells.

The method may further include a step of preparing the dead cells. That is, the method, for example, may include the organic solvent treatment step, and may include the culturing step.

By the method, specifically by allowing a target organism to ingest the active ingredient, RNA silencing can be induced in the target organism, that is, the RNA silencing-inducing effect can be obtained. That is, the method may be a method for inducing RNA silencing in the target organism. In one aspect, activity of the target organism can be suppressed by RNA silencing. That is, one aspect of the method may be a method for suppressing activity of the target organism. In addition, in one aspect, the target organism can be eliminated by RNA silencing. That is, one aspect of the method may be a method for eliminating the target organism. In addition, in one aspect, the harm caused by the target organism can be prevented by RNA silencing. That is, one aspect of the method may be a method for preventing the harm caused by the target organism.

The amount of the active ingredient ingested by the target organism is not particularly limited, so long as the RNA silencing-inducing effect can be obtained. The amount of the active ingredient ingested by the target organism, for example, may be 10 pg-RNA/individual or more, 100 pg-RNA/individual or more, 1 ng-RNA/individual or more, 10 ng-RNA/individual or more, or 100 ng-RNA/individual or more, may be 100 µg-RNA/individual or less, 10 µg-RNA/individual or less, 1 µg-RNA/individual or less, 100 ng-RNA/individual or less, or 10 ng-RNA/individual or less, or may be a range defined as a non-contradictory combination thereof, in terms of the amount of the objective RNA. The amount of the active ingredient ingested by the target organism may be, specifically, for example, 10 pg-RNA/individual to 10 µg-RNA/individual in term of the amount of the objective RNA.

Methods for allowing the target organism to ingest the active ingredient are not particularly limited, so long as the RNA silencing-inducing effect can be obtained. Methods for allowing the target organism to ingest the active ingredient can be appropriately set according to various conditions such as the type of the target organism.

For example, by placing the active ingredient within a living sphere, such as a nest or route of movement, of the target organism, the active ingredient can be ingested by the target organism. In this case, it is sufficient that the active ingredient is placed in the living sphere in a manner that the active ingredient can be ingested by the target organism. For example, a bait for the target organism that holds the active ingredient can be placed in the living sphere. As such a bait, for example, a composition containing the active ingredient and configured as a bait for the target organism can be used. The descriptions concerning the composition can be similarly applied to the composition containing the active ingredient. Furthermore, as such a bait, for example, the active ingredient can be used in combination with a bait for the target organism.

In addition, for example, when the target organism damages an object by feeding on it, by placing the active ingredient in or on the object, the active ingredient can be ingested by the target organism in combination with the object when the target organism eats the object. Examples of the object include plants. That is, the active ingredient can be applied to, for example, the object such as plants. Methods for applying the active ingredient can be appropriately selected according to various conditions such as the type of the object. Examples of application to plants include spraying and painting to a plant body. The active ingredient may be applied to the entire plant body, or may be applied to a portion of the plant body. The active ingredient may be applied to, for example, the entire above-ground part of the plant body. Examples of a portion of the plant body include leaf, stalk, trunk, root, and fruit. The active ingredient may be applied at least to the portion to be eaten by the target organism. When the active ingredient is applied to leaves, the active ingredient may be applied to only the front surface and/or the back surface of leaves, or may be applied to both. The active ingredient may be applied to the object, for example, as it is, or after prepared as a composition containing the active ingredient as required. The descriptions concerning the composition can be similarly applied to the composition containing the active ingredient. The active ingredient can be applied to the object, in particular, in a form of liquid. That is, specifically, for example, the active ingredient can be prepared as a liquid composition containing the active ingredient, and can be applied to the object.

Making the active ingredient ingestible by the target organism, such as by placing the active ingredient in a living sphere of the target organism and applying the active ingredient to the object to be eaten by the target organism, is also referred to as "application of the active ingredient".

The timing and the amount of the application of the active ingredient are not particularly limited, so long as the RNA silencing-inducing effect can be obtained. The timing and the amount of the application of the active ingredient can be appropriately set according to various conditions such as the type of the target organism. The active ingredient, for example, may be preventively applied before the appearance of the target organism, or may be palliatively applied after the appearance of the target organism. The active ingredient may be applied only once, or may be applied twice or more times. The active ingredient may be applied intermittently, or may be applied continuously. The amount of the active ingredient applied can be set so that, for example, the desired amount of the active ingredient ingested as described above can be achieved.

The active ingredient may also be used in combination with another ingredient. The descriptions concerning the ingredient other than the active ingredient in the explanation of the composition can be similarly applied to any other ingredient(s).

The active ingredient can be ingested by the target organism by, for example, applying the composition, that is, allowing the target organism to ingest the composition. That is, one aspect of the method may be, for example, a method of allowing the target organism to ingest the composition. The phrase "allowing the target organism to ingest the active ingredient" also includes allowing the target organism to ingest the composition. Similarly, the active ingredient can be placed in the living sphere of the target organism or applied to the object to be eaten by, for example, applying the composition. That is, the phrase "use of the active ingredient" also includes applying the composition. The composition may be applied, for example, as it is, or after being diluted, dispersed, or dissolved with a liquid such as water, physiological saline, buffer, and alcohol as required. The composition may also be used in combination with another ingredient. The descriptions concerning the ingredient other than the active ingredient in the explanation of the composition can be similarly applied to such another ingredient. The descriptions concerning such an application of the active ingredient as described above can be similarly applied to the application of the composition.

<5> Use of the Active Ingredient

Also provide is the use of the active ingredient for such a purpose as described above. That is, for example, provided is, for example, use of the active ingredient for inducing RNA silencing, suppressing activity of the target organism, eliminating the target organism, or preventing the harm caused by the target organism, and use of the active ingredient for manufacture of a composition for inducing RNA silencing, suppressing activity of the target organism, eliminating the target organism, or preventing the harm caused by the target organism.

EXAMPLES

Hereinafter, the present invention will be more specifically explained with reference to non-limiting examples.

<1> Acquisition of Ribonuclease III Gene-Deficient Strain of *Corynebacterium glutamicum*

A disruption strain of a ribonuclease III (RNaseIII) homologue gene (hereinafter also referred to as rnc gene) of the *C. glutamicum* 2256 strain (ATCC 13869 strain, hereinafter referred to simply as 2256 strain) was constructed in the following manner.

First, a region located at REGION: 2115207.2115950 of the genomic sequence information of the *C. glutamicum* 2256 strain (Accession No. AP017557) in a gene database (GenBank) was deduced to be an rnc gene on the basis of amino acid sequence homology with respect to known RNaseIII. Then, as necessary information for deleting this gene, DNA nucleotide sequence information for the gene's ORF (open reading frame) region and for about 1,000 nucleotides (1 kb) both upstream and downstream of the gene was obtained from the gene database (GenBank).

Next, genome DNA was obtained from cells of the 2256 strain with DNeasy Blood & Tissue Kit (QIAGEN). PCR amplification was performed by using this genome DNA as the template and PrimeSTAR GXL DNA Polymerase (TAKARA BIO), as well as primers of SEQ ID NOS: 1 and 2 to obtain a DNA fragment of about 1 kb of upstream of the rnc gene, and primers of SEQ ID NOS: 3 and 4 to obtain a DNA fragment of about 1 kb of downstream of the rnc gene. The PCR conditions were set according to a protocol recommended by the manufacturer. Then, these DNA fragments were ligated with the plasmid pBS4S (WO2005/113745 and WO2005/113744; not having replication ability in *C. glutamicum*), which harbors a sacB gene, in the following manner. Specifically, PCR amplification was performed by using pBS4S as the template, primers of SEQ ID NOS: 5 and 6, and PrimeSTAR GXL DNA Polymerase to obtain an amplified fragment of pBS4S. Then, both the DNA fragments of the upstream and downstream regions of the rnc gene obtained above and the amplified fragment of pBS4S were mixed, and these three fragments were mutually ligated by using In-Fusion HD Cloning Kit (Clontech) (FIG. 1). Competent cells of the *Escherichia coli* JM109 strain (TAKARA BIO) were transformed with the reaction mixture, applied to LB agar medium containing 25 µg/mL of kanamycin, and cultured at 37° C. overnight. Then, single colonies were isolated from colonies that appeared on the agar medium, to obtain transformants which became resistant to kanamycin. Plasmids were extracted from the obtained transformants in the usual manner. A plasmid containing the DNA fragments of the upstream and downstream regions of the rnc gene was confirmed by a structural analysis, and designated as pBS4SΔrnc (FIG. 1).

This plasmid is not able to autonomously replicate in coryneform bacteria. Therefore, if coryneform bacteria are transformed with this plasmid, transformants in which this plasmid is incorporated into the chromosome by homologous recombination and which thereby have kanamycin resistance appear, although it occurs at an extremely low frequency. Thus, the 2256 strain was transformed with a high concentration of the plasmid pBS4Δrnc by the electric pulse method, applied to CM-Dex agar medium (5 g/L of glucose, 10 g/L of polypeptone, 10 g/L of yeast extract, 1 g/L of $KH_2PO_4$, 0.4 g/L of $MgSO_4$-$7H_2O$, 0.01 g/L of $FeSO_4$-$7H_2O$, 0.01 g/L of $MnSO_4$-$7H_2O$, 3 g/L of urea, 1.2 g/L of soybean hydrolysate, adjusted to pH 7.5 with KOH, 20 g/L of agar) containing 25 μg/mL of kanamycin, and cultured at 30° C. overnight. As a result, a few colonies appeared. These strains grown on the medium each were a so-called once-recombinant strain, in which the kanamycin resistance gene and the sacB gene derived from the plasmid were incorporated into the genome as a result of homologous recombination between a DNA sequence fragment adjacent to (upstream or downstream of) the rnc gene on the plasmid and a region adjacent to the rnc gene on the genome of the 2256 strain.

Then, these once-recombinant strains were each cultured in CM-Dex liquid medium (having the same composition as that of CM-Dex agar medium except that it does not contain agar) not containing kanamycin at 30° C. overnight. The culture broth was appropriately diluted, applied to 10% (w/v)-sucrose-containing Dex-S10 agar medium (10 g/L of sucrose, 10 g/L of polypeptone, 10 g/L of yeast extract, 1 g/L of $KH_2PO_4$, 0.4 g/L of $MgSO_4$-$7H_2O$, 0.01 g/L of $FeSO_4$-$7H_2O$, 0.01 g/L of $MnSO_4$-$4$-$5H_2O$, 3 g/L of urea, 1.2 g/L of soybean protein hydrolysate solution, 10 μg/L of biotin, adjusted to pH 7.5 with KOH, 20 g/L of agar) not containing kanamycin, and cultured at 30° C. overnight. As a result, a few colonies appeared. Thus, the colonies that appeared were applied to colony PCR using KOD FX NEO (TOYOBO), to select rnc gene-deficient strains. As a result of an analysis of the length of the rnc gene region of those strains through PCR amplification with primers of SEQ ID NOS: 7 and 8, some strains provided a DNA fragment having a shorter length in PCR amplification than that observed for the case of using the genome DNA of the 2256 strain (wild-type) as the template. Thus, one strain thereof was selected as an rnc gene-deficient strain, and designated as 2256Arnc strain.

<2> Curing of Endogenous Plasmid pAM330 of 2256 Strain

Figure 2:
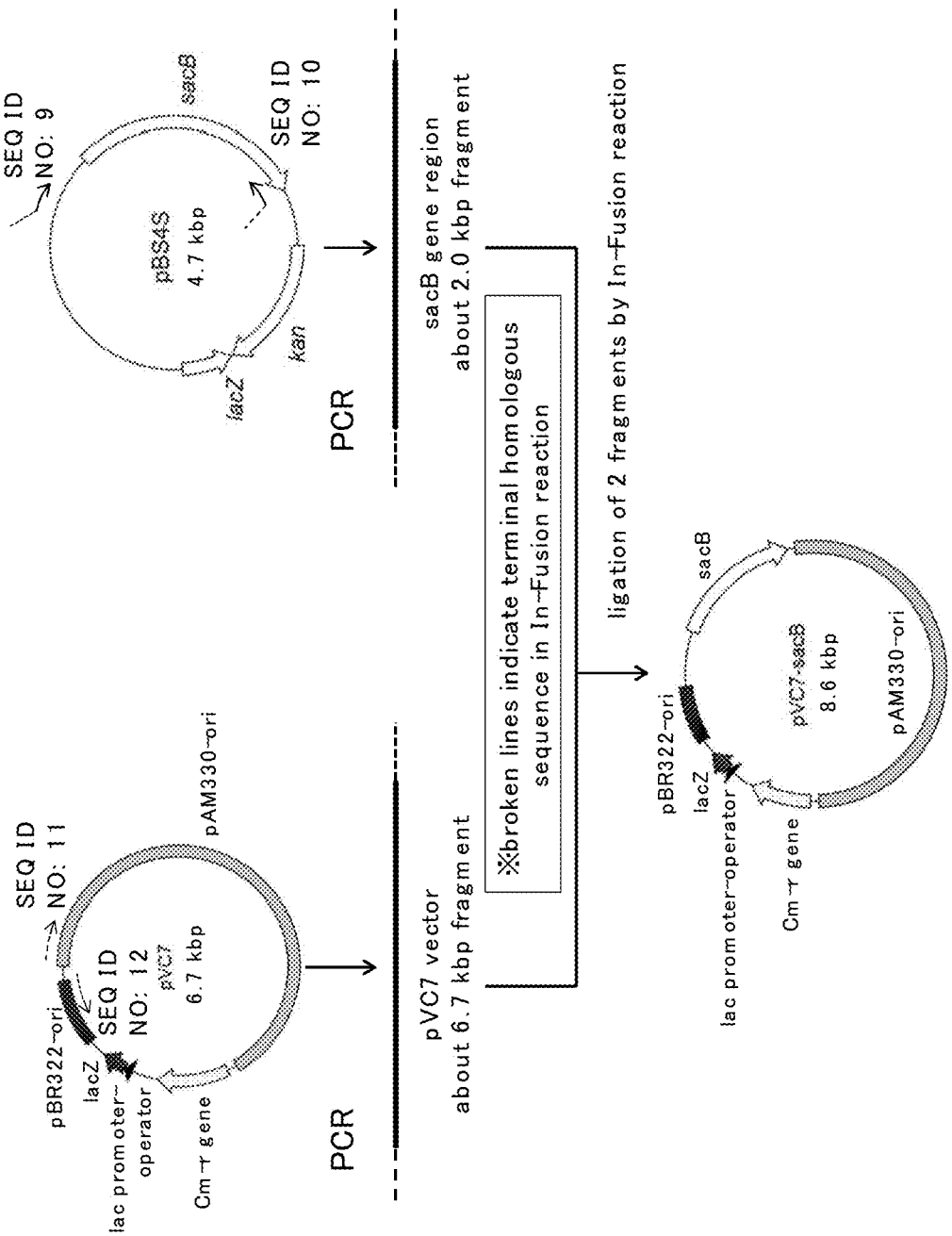
FIG. 2 shows a diagram showing a construction procedure of a plasmid pVC7-sacB.

The 2256 strain has pAM330 as an endogenous plasmid (Yamaguchi, Ryuji, et al. "Determination of the complete nucleotide sequence of *Brevibacterium lactofermentum* plasmid pAM330 and analysis of its genetic information." Agricultural and biological chemistry 50.11 (1986): 2771-2778.). There was constructed a plasmid pVC7-sacB, which corresponds to a plasmid pVC7 (JP1997-070291A) incorporated with a sacB gene. pVC7 is a composite plasmid of pAM330 and an *Escherichia coli*-universal vector pHSG399 (TAKARA BIO). Specifically, PCR amplification was performed by using pBS4S plasmid as the template, primers of SEQ ID NOS: 9 and 10, and PrimeSTAR GXL DNA Polymerase to obtain an amplified fragment of the sacB gene. Separately, PCR amplification was performed by using pVC7 plasmid as the template, primers of SEQ ID NOS: 11 and 12, and KOD FX NEO (TOYOBO) to obtain an amplified fragment of pVC7. The thus-obtained amplified fragments were mixed, and mutually ligated by using In-Fusion HD Cloning Kit (Clontech). Then, competent cells of the *Escherichia coli* JM109 strain (TAKARA BIO) were transformed with the reaction mixture, applied to LB agar medium containing 25 μg/mL of chloramphenicol, and cultured at 37° C. overnight. Then, single colonies were isolated from colonies that appeared. Plasmid DNAs were extracted from the obtained transformants in the usual manner. An objective plasmid was identified by DNA sequencing analysis, and designated as pVC7-sacB (FIG. 2). The strain 2256Δrnc was introduced with pVC7-sacB by the electric pulse method, applied to CM-Dex agar medium containing 5 μg/mL of chloramphenicol, and cultured at 30° C. overnight, to obtain a plurality of transformants for 2256Δrnc/pVC7-sacB strain. Then, these strains were each cultured in CM-Dex medium overnight, applied to Dex-S10 agar medium, and cultured at 30° C. overnight, to obtain 2256ΔrncΔpAM330 strain, which was cured of pVC7-sacB to thereby become insensitive to sucrose.

<3> Construction of Expression Vector

The $1172^{nd}$ nucleotide of the total 6679 bp nucleotide sequence of the plasmid pVC7 (Japanese Patent Laid-open (Kokai) No. 1997-070291) was mutated from cytosine (C) to adenine (A), in which the nucleotide A at $2^{nd}$ position counted from the 5' terminus of the digestion recognition site of the restriction enzyme HindIII is regarded as "+1", to thereby obtain pVC7H2. Incidentally, pVC7H2 was prepared by using KOD-Plus-Mutagenesis Kit (TOYOBO). Specifically, the plasmid pVC7 was used as the template in combination with primers of SEQ ID NOS: 13 and 14 according to a preparation manual enclosed in the kit, to thereby prepare pVC7H2. The 2256ΔpAM330 strain was transformed with pVC7H2 in a conventional manner. CM-Dex medium containing chloramphenicol (5 μg/ml) was used as a selection medium. As a result, colonies formed well. One of the colonies was inoculated into CM-Dex liquid medium containing chloramphenicol (5 mg/L), and cultured at 30° C. with shaking overnight. The contained plasmid was extracted from the culture broth in the usual manner, and a part of the prepared plasmid solution was applied to agarose gel electrophoresis to confirm DNA band of the plasmid. As a result, pVC7H2 showed a high copy number.

<4> Construction of Objective RNA Expression Plasmid pVC7H2-Pf1-Hv-iap-Pf1rev

A plasmid, pVC7H2-Pf1-Hv-iap-Pf1rev, for expression of Hv-iap RNA as objective RNA under control of F1 promoter in dual directions was constructed in the following manner.

Figure 3:
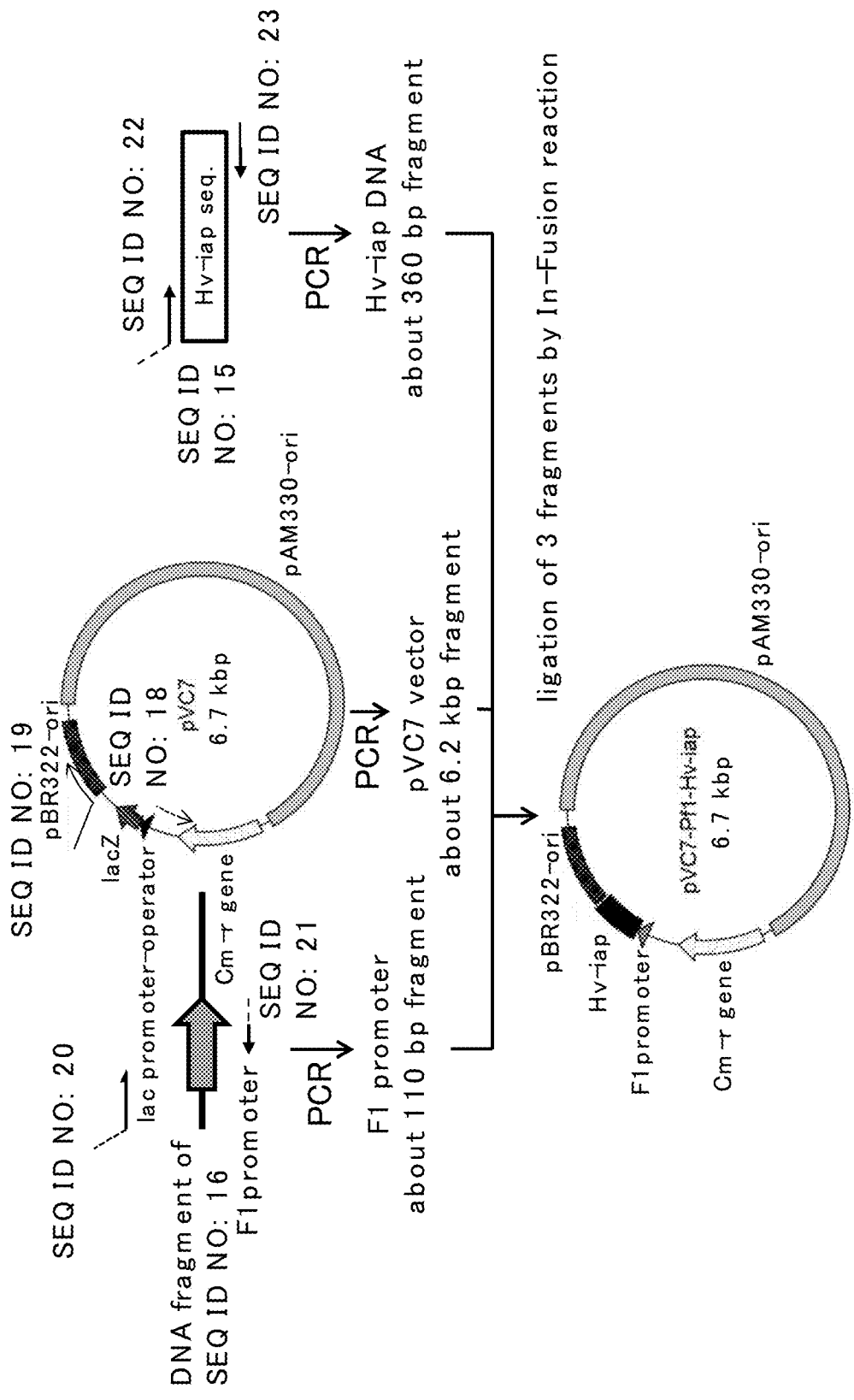
FIG. 3 shows a diagram showing a construction procedure of a plasmid pVC7-Pf1-Hv-iap.

A DNA fragment of Hv-iap (SEQ ID NO: 15), which is a partial sequence of cDNA of an iap gene encoding an inhibitor of apoptosis protein IAP of Henosepilachna vigintioctopunctata, was prepared by chemical synthesis on the basis of information described in WO2010/140675. Separately, a DNA fragment of SEQ ID NO: 16, which contains F1 promoter derived from a bacteriophage BFK20 (SEQ ID NO: 17), was prepared by chemical synthesis. There was constructed a plasmid containing a DNA sequence containing the F1 promoter and the Hv-iap sequence ligated immediately downstream thereof in the following manner (FIG. 3). First, PCR amplification was performed by using pVC7 as the template, primers of SEQ ID NOS: 18 and 19, and KOD FX NEO (TOYOBO) to obtain a DNA fragment of pVC7. Separately, PCR amplification was performed by using the DNA fragment of SEQ ID NO: 16 as the template, primers of SEQ ID NOS: 20 and 21, and PrimeSTAR HS (TAKARA BIO) to obtain a DNA fragment containing the F1 promoter sequence. Separately, PCR amplification was performed by using the DNA fragment of SEQ ID NO: 15 as the template, primers of SEQ ID NOS: 22 and 23, and PrimeSTAR HS (TAKARA BIO) to obtain a DNA fragment of the Hv-iap sequence. These three DNA fragments were mixed, and mutually ligated by using In-Fusion HD Cloning Kit (Clontech). Then, competent cells of the *Escherichia coli* JM109 strain (TAKARA BIO) were transformed with the reaction mixture, and strains resistant to 25 µg/mL of chloramphenicol were obtained. Plasmids were extracted from the obtained transformants in the usual manner. Objective plasmids were confirmed by DNA sequencing analysis, and one of them was designated as pVC7-Pf1-Hv-iap (FIG. 3).

Figure 4:
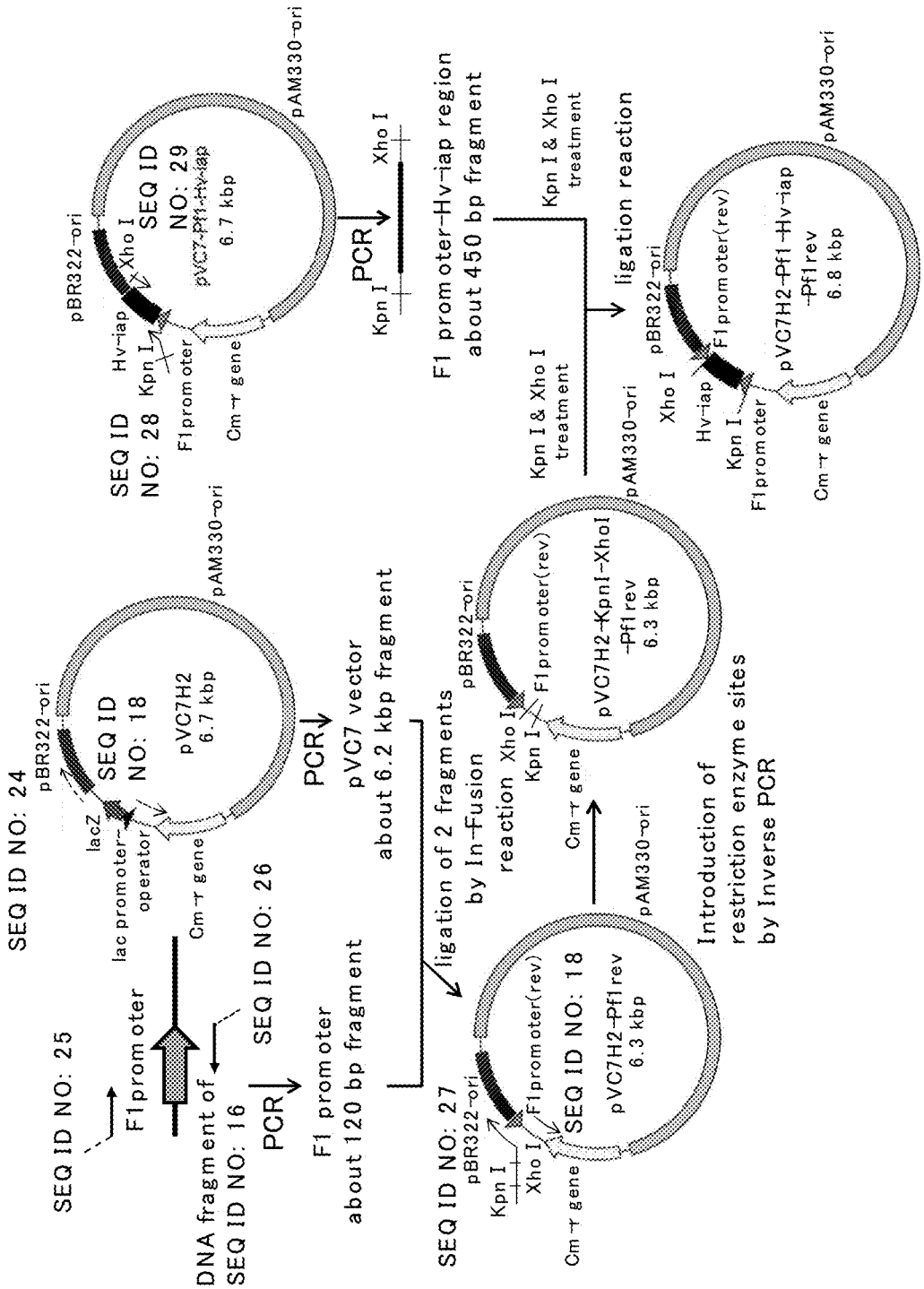
FIG. 4 shows a diagram showing a construction procedure of a plasmid pVC7H2-Pf1-Hv-iap-Pf1rev.

PCR amplification was performed by using pVC7H2 as the template, primers of SEQ ID NOS: 18 and 24, and KOD FX NEO (TOYOBO) to obtain a DNA fragment of pVC7H2. Separately, PCR amplification was performed by using the DNA fragment of SEQ ID NO: 16 as the template, primers of SEQ ID NOS: 25 and 26, and PrimeSTAR HS (TAKARA BIO) to obtain a DNA fragment of the F1 promoter sequence. Both of the thus-obtained DNA fragments were mixed, and mutually ligated by using In-Fusion HD Cloning Kit (Clontech). Then, competent cells of the *Escherichia coli* JM109 strain (TAKARA BIO) were transformed with the reaction mixture, applied to LB agar medium containing 25 µg/mL of chloramphenicol, and cultured at 37° C. overnight. Then, single colonies were isolated from colonies that appeared. Plasmids were extracted from the obtained transformants in the usual manner. An objective plasmid was confirmed by DNA sequencing analysis, and designated as pVC7H2-Pf1rev (FIG. 4).

Next, in order to introduce restriction enzyme sites KpnI and XhoI downstream of the F1 promoter of pVC7H2-Pf1rev, inverse PCR was performed by using pVC7H2-Pf1rev as the template, primers of SEQ ID NOS: 18 and 27, and KOD-Plus-Mutagenesis Kit (TOYOBO). Then, the amplified DNA fragment was subject to DpnI treatment, phosphorylation reaction, and self-ligation reaction to thereby be cyclized, and introduced into competent cells of the *Escherichia coli* JM109 strain (TAKARA BIO). The cells were applied to LB agar medium containing 25 µg/mL of chloramphenicol, and cultured at 37° C. overnight. Then, single colonies were isolated from colonies that appeared. Plasmids were extracted from the obtained transformants in the usual manner. An objective plasmid was confirmed by DNA sequencing analysis, and designated as pVC7H2-KpnI-XhoI-Pf1rev (FIG. 4).

Then, PCR was performed by using pVC7-Pf1-Hv-iap as the template, primers of SEQ ID NOS: 28 and 29, and PrimeSTAR HS (TAKARA BIO) to obtain a DNA fragment containing the KpnI restriction enzyme site, F1 promoter region, Hv-iap region, and XhoI restriction enzyme site in this order. This DNA fragment and pVC7H2-KpnI-XhoI-Pf1rev were each digested with restriction enzymes KpnI and XhoI, and purified with MinElute PCR Purification Kit (QIAGEN). Both the purified products were mixed, and mutually ligated by a ligation reaction using Ligation high Ver.2 (TOYOBO). Then, competent cells of the *Escherichia coli* JM109 strain (TAKARA BIO) were transformed with the reaction mixture, and strains resistant to 25 µg/mL of chloramphenicol were obtained. Plasmids were extracted from the obtained transformants in the usual manner. An objective plasmid was confirmed by DNA sequencing analysis, and designated as pVC7H2-Pf1-Hv-iap-Pf1rev (FIG. 4).

<5> Ethanol Treatment of Coryneform Bacterium Cells Containing Hv-iap RNA

The plasmids pVC7H2 and pVC7H2-Pf1-Hv-iap-Pf1rev prepared in the aforementioned Examples were each introduced into the *C. glutamicum* 2256ΔrncΔpAM330 strain by the method described in the aforementioned Examples, to thereby obtain transformants. These transformants were each cultured in CM-Dex medium added with 5 µg/mL of chloramphenicol with shaking for 24 hours. Then, a part of the culture broth was separated, diluted $10^7$-folds, and inoculated to CM-Dex agar medium, to thereby measure the viable cell count in the culture broth. As a result, the viable cell count was determined to be $4.4 \times 10^9$ cells/mL. Next, a 0.2-mL aliquot of the culture broth was centrifuged, to collect cells. The cells were added with 1 mL of 10 mM phosphate buffer (pH 6.8) containing ethanol at each concentration shown in Table 1, and firmly mixed, to thereby subject the cells to ethanol treatment. That is, the viable cell concentration at the start of the ethanol treatment was approximately $10^9$ cells/mL. The treatment temperature and the treatment period were a room temperature (approximately 25° C.) and 10 minutes. The cell suspension after the treatment was centrifuged (12,000 rpm for 2 minutes), a supernatant was removed, and then 0.2 mL of CM-Dex medium was added thereto, to suspend cells. A 0.1-mL aliquot of the suspension (approximately $4 \times 10^8$ cells in terms of the viable cell count) was applied to CM-Dex agar medium, to confirm growth.

Results are shown in Table 1. In cases of cells treated with ethanol at an ethanol concentration range from 30% to 95%, no colonies formed on the agar medium. That is, the cell viability rate was reduced at least to $10^{-8}$ or lower at an ethanol concentration range from 30% to 95%. Thus, it was revealed that cells of the coryneform bacterium are substantially completely sterilized at an ethanol concentration of 30% or higher.

TABLE 1

Ethanol treatment and viability rate of coryneform bacterium

| | EtOH concentration (v/v %) | | | | | |
|---|---|---|---|---|---|---|
| | 0 | 10 | 20 | 30 | 40 | 50 |
| Viability rate | ++ | ++ | ++ | <$10^{-8}$ | <$10^{-8}$ | <$10^{-8}$ |

| | EtOH concentration (v/v %) | | | | |
|---|---|---|---|---|---|
| | 60 | 70 | 80 | 90 | 95 |
| Viability rate | <$10^{-8}$ | <$10^{-8}$ | <$10^{-8}$ | <$10^{-8}$ | <$10^{-8}$ |

++: Cells grew throughout the plate.

Next, in order to determine the change of the objective RNA in cells by ethanol treatment, cells collected after the aforementioned ethanol treatment were left to stand at a room temperature for 24 hours, and then the total RNA was extracted from the cells and subject to a non-denaturing PAGE. Specifically, 225 µl of 15 mg-lysozyme (Sigma)/ml-TE buffer was added to the cells to perform a reaction at a room temperature for 30 minutes, 25 µl of 20 mg/ml ProteinaseK (Takara) was further added thereto to perform a reaction for further 30 minutes, and then RNA was extracted using TRIzol LS Reagent (Thermo Fisher Scientific) according to the protocol. Evaluation by the Non-denaturing PAGE was carried out using 6% TBE Gel (Novex) according to the protocol.

As a control group for this RNA stability evaluation, a cell suspension was used, which cell suspension was obtained by suspending cells obtained from 0.2 mL of the culture broth only with 1 mL of 10 mM phosphate buffer (pH 6.8) without ethanol treatment. Specifically, the cell suspension with the phosphate buffer was left to stand for 10 minutes, centrifuged to remove a supernatant to prepare cells, and the cells were left to stand at a room temperature for 24 hours and then used as "untreated" sample. Separately, cells after cultivation were immediately treated with RNAprotect Bacteria Reagent (Qiagen) and then used as "P.C." sample.

Figure 5:
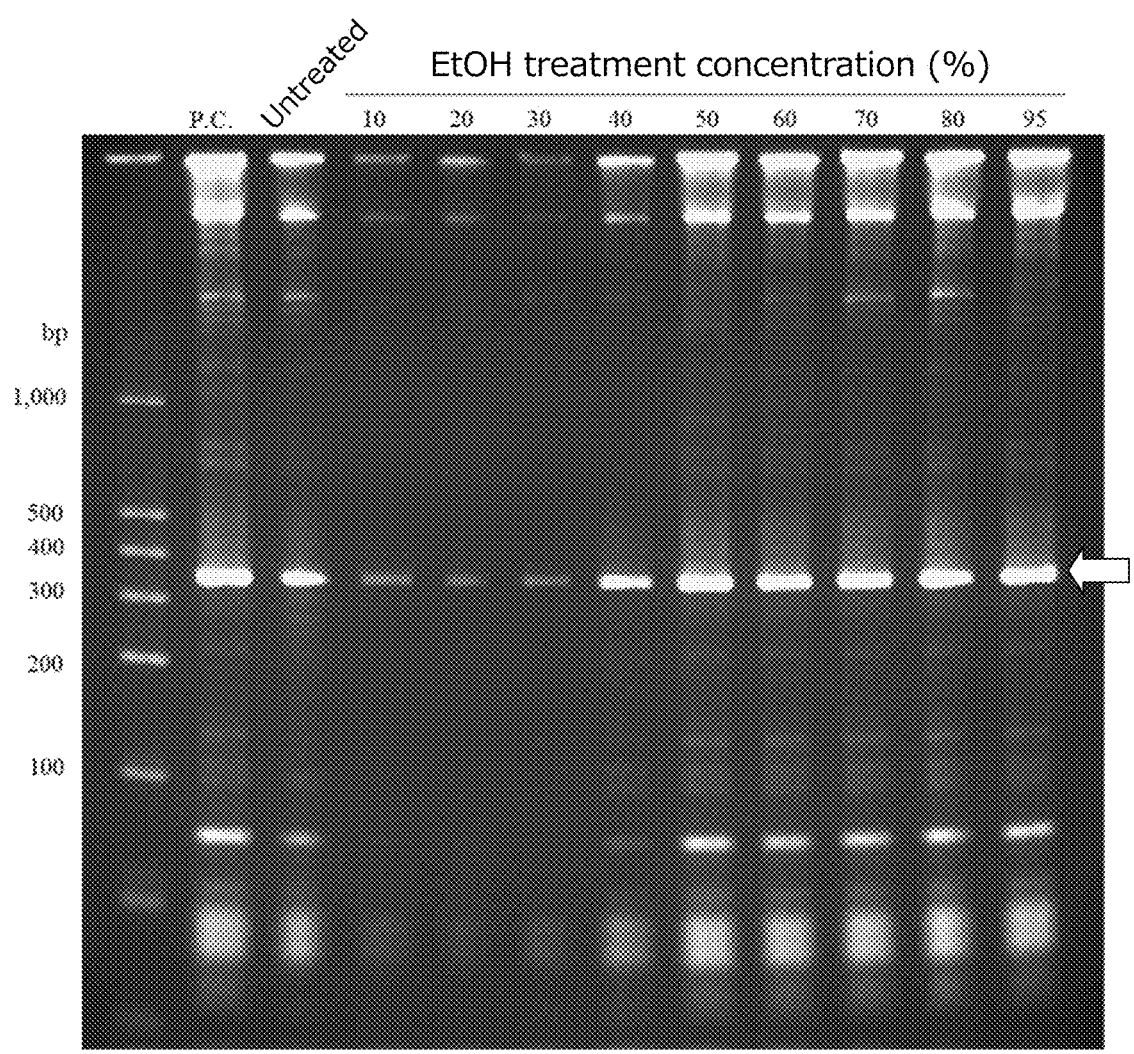
FIG. 5 is a photograph showing results of electrophoresis of non-denaturing PAGE of RNA extracted from cells of a coryneform bacterium retaining objective RNA after ethanol treatment of the cells. The arrow indicates the position of the objective RNA.

Results are shown in FIG. 5. The band of the objective RNA having a length of around 350 bp observed for the samples treated with ethanol at a concentration of 10% (v/v) to 40% (v/v) was smaller in amount than that observed for the "P.C." control group, whereas that observed for the samples treated with ethanol at a concentration of 50% (v/v) to 95% (v/v) was maintained at a level almost equal to that observed for the "P.C." control group. In addition, since the amount of the objective RNA observed for the samples treated with ethanol at a concentration of 50% (v/v) to 95% (v/v) was also larger than that observed for the "untreated" sample, it was revealed that the objective RNA-producing microorganism can be sterilized while the objective RNA in cells are maintained more stably by carrying out ethanol treatment.

<6> Methanol treatment of coryneform bacterium cells containing Hv-iap RNA

Cells of the coryneform bacterium were treated with methanol at a concentration of 10% (v/v) to 95% (v/v) in 10 mM phosphate buffer (pH 6.8) in a similar manner to the Example <5>, and the viability rate of the coryneform bacterium and the accumulation amount of the objective RNA were evaluated.

Figure 6:
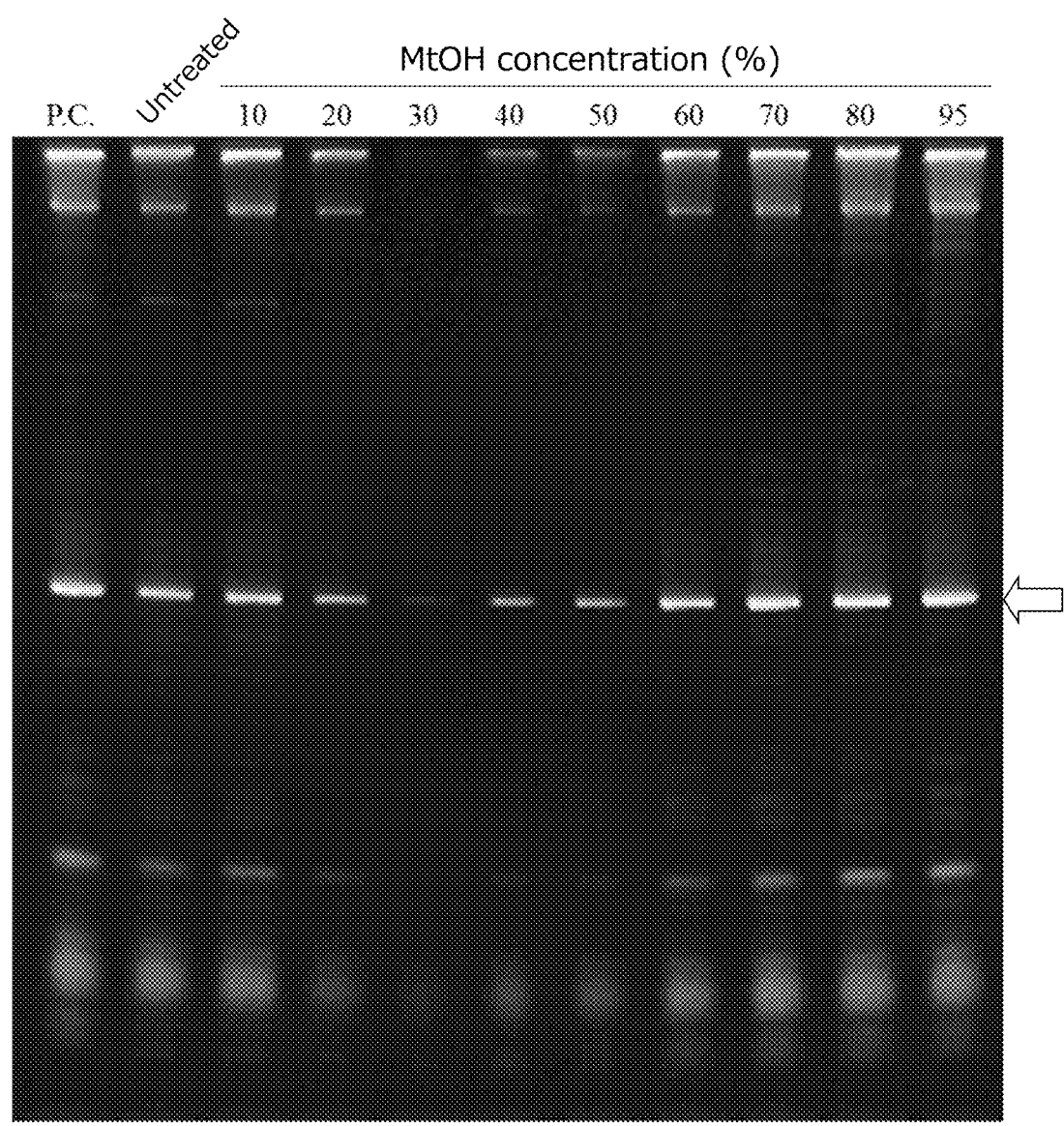
FIG. 6 is a photograph showing results of electrophoresis of non-denaturing PAGE of RNA extracted from cells of a coryneform bacterium retaining objective RNA after methanol treatment of the cells. The arrow indicates the position of the objective RNA.

Results are shown in Table 2 and FIG. 6. The cell viability rate was reduced at least to $10^{-8}$ or lower at a methanol concentration range from 50% to 95%. Thus, it was revealed that cells of the coryneform bacterium are substantially completely sterilized at a methanol concentration of 50% or higher. It was also revealed that the objective RNA in cells are well maintained for the groups treated with methanol at a concentration of 70% to 95%.

TABLE 2

Methanol treatment and viability rate of coryneform bacterium

| | MtOH concentration (v/v %) | | | | |
|---|---|---|---|---|---|
| | 0 | 10 | 20 | 30 | 40 | 50 |
| Viability rate | ++ | ++ | ++ | ++ | ± | <$10^{-8}$ |

| | MtOH concentration (v/v %) | | | | |
|---|---|---|---|---|---|
| | 60 | 70 | 80 | 90 | 95 |
| Viability rate | <$10^{-8}$ | <$10^{-8}$ | <$10^{-8}$ | <$10^{-8}$ | <$10^{-8}$ |

++: Cells grew throughout the plate.

<7> Heat Treatment of Coryneform Bacterium Cells Containing Hv-iap RNA

A 0.2-mL aliquot of the culture broth obtained in the Example <5> was aseptically placed in an Eppendorf tube, and cells obtained by centrifugation were suspended in 1 mL of 10 mM phosphate buffer (pH 6.8) and left to stand for 10 minutes. Cells obtained by again centrifuging the suspension were sterilized by heating for 30 minutes using a heat block set to 100° C. Cells after heat treatment were added with 0.2 mL of CM-Dex medium, to suspend the cells. A 0.1-mL aliquot of the suspension was applied to CM-Dex agar medium, and as a result, no colonies formed on the agar medium. That is, the cell viability rate was reduced at least to $10^{-8}$ or lower. Thus, it was revealed that cells of the coryneform bacterium are substantially completely sterilized by heat treatment at 100° C. for 30 minutes. As described above, heat treated cells containing the objective RNA were prepared.

Figure 7:
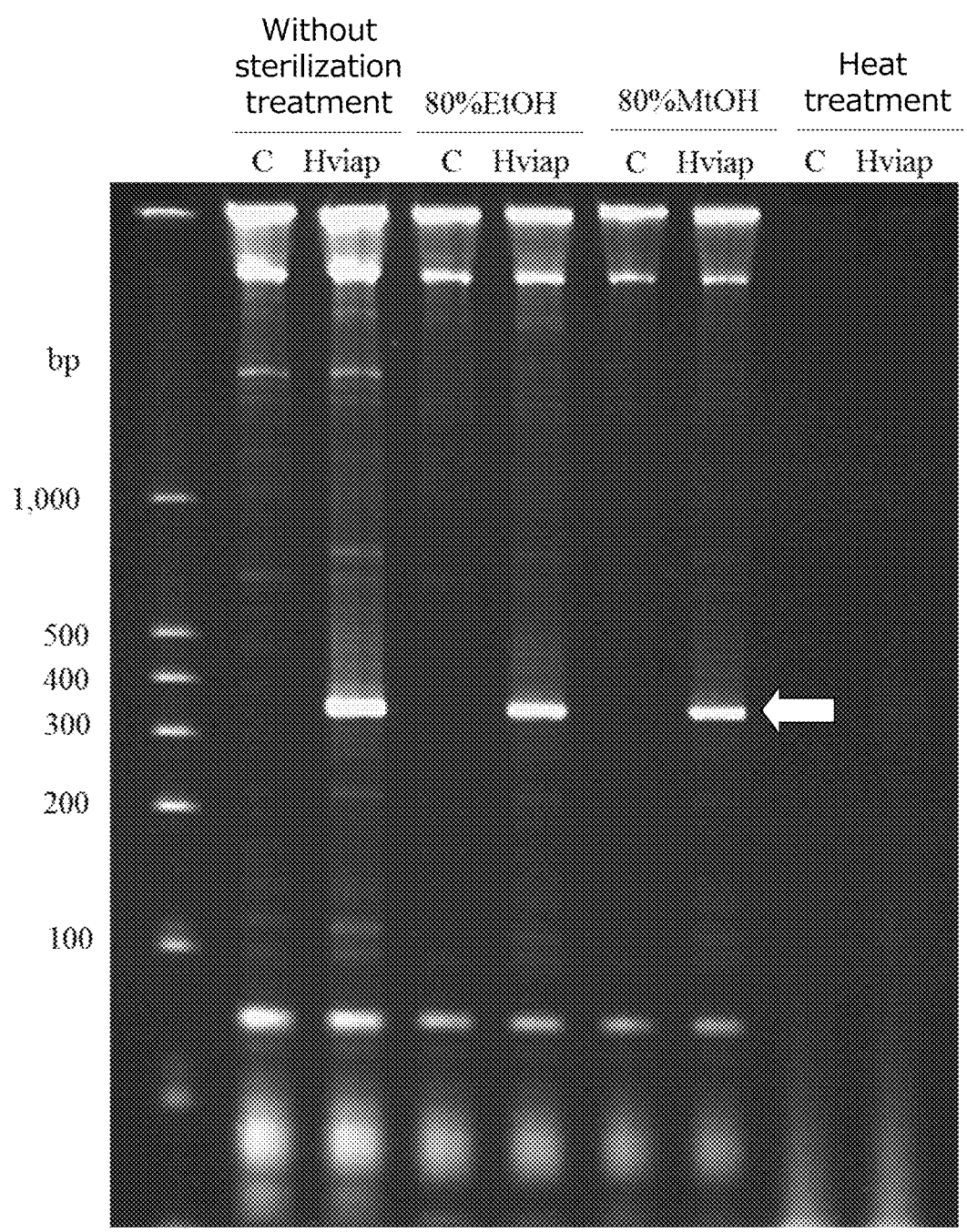
FIG. 7 is a photograph showing results of electrophoresis of RNA extracted from cells of a coryneform bacterium subjected to various treatments, which have been used in an administration experiment to Henosepilachna vigintioctopunctata. C, Hv-iap RNA non-producing strain 2256ΔrncΔpAM330/pVC7H2; Hv-iap, Hv-iap RNA producing strain 2256ΔrncΔpAM330/pVC7H2-Pf1-Hv-iap-Pf1rev. Without sterilization treatment: RNA extracted by immediately subjecting cultured cells to RNA protect Bacteria Reagent without sterilization of the cells. The arrow indicates the migration position of the objective RNA.

<8> Administration Test of Coryneform Bacterium Cells Containing Hv-iap RNA to Henosepilachna Vigintioctopunctata An administration test to Henosepilachna vigintioctopunctata was carried out using the cells subjected to the treatment with the respective alcohols at a concentration of 80% (v/v) prepared in the Examples <5> and <6> and the cells subjected to the heat treatment at 100° C. for 30 minutes prepared in the Example <7>. That is, as the Hv-iap-producing microorganism, the 2256ΔrncΔpAM330/pVC7H2-Pf1-Hv-iap-Pf1rev strain was used. As a control group, the 2256ΔrncΔpAM330/pVC7H2 strain, which has been introduced with a vector not producing Hv-iap. As a result of evaluating RNA in the cells after the respective treatments by Non-denaturing PAGE, the RNA band of Hv-iap as the objective RNA was observed more clearly for the cases of ethanol treatment and methanol treatment than the case of heat treatment, and that is, Hv-iap was confirmed to be maintained in cells for the cases of ethanol treatment and methanol treatment (FIG. 7).

Next, cell samples subjected to ethanol treatment, methanol treatment, or heat treatment were prepared in the following manner, in order to allow Henosepilachna vigintioctopunctata, which is a crop pest, to ingest them.

The ethanol-treated cell sample and the methanol-treated cell sample were prepared in the following manner. A 1.5-mL aliquot of the culture broth obtained in the Example <5> was centrifuged to collect cells. The thus-obtained cell pellet was added with 1125 µl of sterilized milliQ water and 375 µl of 200 mM phosphate buffer, and suspended by pipetting. Then, the suspension was placed in a 15-mL volume Falcon tube, 6 ml of ethanol or methanol was added thereto, and firmly mixed. The mixture was left to stand at a room temperature for 10 minutes, and then centrifuged at 5,000 rpm (3,270 g) for 10 minutes, to thereby collect cells. Then, 7.5 mL of 10 mM phosphate buffer (pH 6.8) was added thereto to suspend the cells, and the suspension was centrifuged. The thus-obtained cells were washed, and then added with 0.8 mL of 10 mM phosphate buffer (pH 6.8) to again suspend the cells. The suspension was placed in an Eppendorf tube, and a supernatant was removed after centrifugation, to thereby obtain ethanol-treated cells or methanol-treated cells.

The heat-treated cell sample was prepared in the following manner. A 1.5-mL aliquot of the culture broth obtained in the Example <5> was centrifuged. The thus-collected cells were added with 7.5 mL of 10 mM phosphate buffer (pH 6.8) to suspend the cells. The suspension was transferred to five tubes in a volume of approximately 1.5 mL per tube, and then centrifuged at 14,000 g for 5 minutes, and a supernatant was removed. The tubes containing cells were placed on a heat block set to 100° C., and heated for 30 minutes. Then, 0.8 mL of 10 mM phosphate buffer (pH 6.8) was added each tube to suspend the cells. The suspension was finally collected to one Eppendorf tube, and a supernatant was removed by centrifugation, to thereby obtain heat-treated cells.

The thus-prepared samples subjected to ethanol treatment, methanol treatment, or heat treatment were each added with 50 µl of distilled water and suspended, to thereby prepare each cell suspension. Then, a 3rd-instar larva of Henosepilachna vigintioctopunctata was allowed to orally ingest a 0.5-µl aliquot of this cell suspension. Separately, as a control group, a 3rd-instar larva of Henosepilachna vigintioctopunctata was allowed to only ingest water. That is, experimental groups were set as 7 groups shown in Table 3, and 4 to 5 larvae were used for each experimental group. After ingestion of the sample (cell suspension or water), the larvae were transferred to potato leaves for feeding. After 24 hours, the larvae of each experimental group were transferred to fresh potato leaves, and the old potato leaves subjected to feeding were collected. After further 24 hours (after 48 hours from ingestion of the sample), the potato leaves subjected to feeding were collected. The degrees of feeding of potato leaves by the larvae at 0 to 24 hours and at 24 to 48 hours were measured, and used as feeding data of "after 24 hours" and "after 48 hours", respectively.

Results are shown in Table 3. It was revealed that objective RNA-containing cells can be sterilized by treating the cells with an appropriate concentration of ethanol or methanol, and thereby objective RNA-containing dead cells that can induce RNA silencing in an objective pest can be prepared (experimental groups 3 and 5). That is, it was revealed that this method is extremely effective for inducing RNA silencing as compared with the known method for preparing RNA-containing dead cells by heat treatment (experimental group 7).

TABLE 3

| No. | Experimental group | Hv-iap RNA production | After 24 hours* | After 48 hours* |
|---|---|---|---|---|
| 1 | Control group (only water) | No | +++ | +++++ |
| 2 | Ethanol-treated group | No | +++ | +++++ |
| 3 | Ethanol-treated group | Yes | + | + |
| 4 | Methanol-treated group | No | +++ | +++++ |
| 5 | Methanol-treated group | Yes | + | + |
| 6 | Heat-treated group | No | +++ | +++++ |
| 7 | Heat-treated group | Yes | +++ | ++++ |

*These columns indicate the degrees of feeding of potato leaves by *Henosepilachna vigintioctopunctata* larvae collected after 24 hours and after 48 hours. A larger number of "+" indicates a larger degree of feeding, i.e. a better growth of *Henosepilachna vigintioctopunctata* larvae.

<9> Construction of Objective RNA Expression Plasmid pL4440-Pt7-Hviap-Pt7rev

A plasmid, pL4440-Pt7-Hviap-Pt7rev, for expression of Hv-iap RNA as objective RNA under control of T7 promoter in dual directions was constructed in the following manner.

<9-1> Preparation of pVC7-Pt7-KpnI-XhoI-Pt7rev

PCR amplification was performed by using pVC7 as the template, primers of SEQ ID NOS: 32 and 33, and KOD FX NEO (TOYOBO) to obtain a DNA fragment of pVC7. Next, DNA fragments of SEQ ID NOS: 34 and 35 were synthesized and mutually annealed to obtain a DNA fragment containing T7-promoter region, KpnI restriction site, XhoI restriction site, and T7-promoter (reversed-direction) in this order. Both the DNA fragments were mixed, and mutually ligated by using In-Fusion HD Cloning Kit (Clontech). Then, competent cells of the *Escherichia coli* JM109 strain (TAKARA BIO) were transformed with the reaction mixture, applied to LB agar medium containing 25 µg/mL of chloramphenicol, and cultured at 37° C. overnight. Then, single colonies were isolated from colonies that appeared. Plasmids were extracted from the obtained transformants in the usual manner. An objective plasmid was confirmed by DNA sequencing analysis, and designated as pVC7-Pt7-KpnI-XhoI-Pt7rev.

<9-2> Preparation of pVC7-Pt7-Hviap-Pt7rev

PCR amplification was performed by using the DNA fragment of Hv-iap (SEQ ID NO: 15), which is a partial sequence of cDNA of an iap gene encoding an inhibitor of apoptosis protein IAP of Henosepilachna vigintioctopunctata, as the template, primers of SEQ ID NOS: 36 and 37, and KOD FX NEO (TOYOBO) to obtain a DNA fragment containing KpnI restriction site, Hv-iap sequence, and XhoI restriction site in this order. Then, this DNA fragment and pVC7-Pt7-KpnI-XhoI-Pt7rev were each digested with restriction enzymes KpnI and XhoI, and purified using MinElute PCR Purification Kit (Qiagen). Both the purified products were mixed, and mutually ligated by a ligation reaction using Ligation high Ver.2 (TOYOBO). Then, competent cells of the *Escherichia coli* JM109 strain (TAKARA BIO) were transformed with the reaction mixture, applied to LB agar medium containing 25 µg/mL of chloramphenicol, and cultured at 37° C. overnight. Then, single colonies were isolated from colonies that appeared. Plasmids were extracted from the obtained transformants in the usual manner. An objective plasmid was confirmed by DNA sequencing analysis, and designated as pVC7-Pt7-Hviap-Pt7rev.

<9-3> Preparation of pL4440-Pt7-Hviap-Pt7rev

PCR amplification was performed by using a plasmid L4440 (US2017-0137841) as the template, primers of SEQ ID NOS: 38 and 39, and KOD FX NEO (TOYOBO) to obtain a DNA fragment. Separately, PCR amplification was performed by using the plasmid pVC7-Pt7-Hviap-Pt7rev as the template, primers of SEQ ID NOS: 40 and 41, and KOD FX NEO (TOYOBO) to obtain a DNA fragment. Both the DNA fragments were mixed, and mutually ligated by using In-Fusion HD Cloning Kit (Clontech). Then, competent cells of the *Escherichia coli* JM109 strain (TAKARA BIO) were transformed with the reaction mixture, applied to LB agar medium containing 100 µg/mL of ampicillin, and cultured at 37° C. overnight. Then, single colonies were isolated from colonies that appeared. Plasmids were extracted from the obtained transformants in the usual manner. An objective plasmid was confirmed by DNA sequencing analysis, and designated as pL4440-Pt7-Hviap-Pt7rev.

<10> Preparation of E. coli Cells Containing Hv-iap RNA

The plasmid pL4440-Pt7-Hviap-Pt7rev was introduced to the *E. coli* HT115(DE3) strain (GE Healthcare Dharmacon), to thereby obtain a transformant pL4440-Pt7-Hviap-Pt7rev/HT115(DE3). This transformant was cultured in LB medium added with 100 µg/mL of ampicillin with shaking at 120 rpm at 37° C. When the OD660 of the culture broth reached about 0.5 at approximately 3 hours after the start of the culture, IPTG (isopropyl-β-thiogalactopyranoside) was added at a final concentration of 1 mM, and the culture was continued for further 3 hours. A part of the culture broth was separated and diluted $10^4$-folds with LB medium, and a 0.1-mL aliquot of the diluted suspension was inoculated to LB agar medium, to thereby measure the viable cell count in the culture broth. As a result, the viable cell count was determined to be approximately $2\times10^7$ cells/mL. Next, cells were subject to ethanol treatment. Cells collected by centrifugation from 5.6 mL of the culture broth were added with 5.6 mL of 10 mM phosphate buffer (pH6.8) containing 80% ethanol, firmly mixed, and left to stand at a room temperature (25° C.) for 10 minutes, to thereby perform ethanol treatment. Then, ethanol treated cells were collected by centrifugation.

Separately, in order to determine the viability rate after ethanol treatment, ethanol treatment was performed in a similar manner to that described above, and 0.1 mL of the treated cell suspension in terms of a volume of the culture broth (approximately $2\times10^6$ cells in terms of the viable cell count before ethanol treatment) was applied to LB agar medium. As a result, no colonies formed on the agar medium. That is, the cell viability rate was reduced to $1/(2\times10^6)$ or lower. Thus, it was confirmed that E. coli cells are substantially completely sterilized at the aforementioned ethanol treatment.

Separately, the vector plasmid L4440 was introduced to the E. coli HT115(DE3) strain, to thereby obtain a transformant L4440/HT115(DE3). In a similar manner to that described above, this transformant was cultured, cells collected from 5.6 mL of the culture broth were subject to ethanol treatment, and ethanol treated cells were collected.

In addition, accumulation of Hv-iap RNA in cells was confirmed in a similar manner to the Example <5>.

<11> Administration test of E. coli Cells Containing Hv-iap RNA to Henosepilachna Vigintioctopunctata The ethanol-treated samples prepared in the Example <10> were each added with 50 μl of distilled water and suspended, to thereby prepare each cell suspension. Then, a 3rd-instar larva of Henosepilachna vigintioctopunctata was allowed to orally ingest a 0.5-μl aliquot of this cell suspension. Separately, as a control group, a 3rd-instar larva of Henosepilachna vigintioctopunctata was allowed to only ingest water. That is, experimental groups were set as 3 groups shown in Table 4, and 5 larvae were used for each experimental group. After ingestion of the sample (cell suspension or water), the larvae were transferred to potato leaves for feeding. After 24 hours, the larvae of each experimental group were transferred to fresh potato leaves, and the old potato leaves subjected to feeding were collected. After further 24 hours (after 48 hours from ingestion of the sample), the potato leaves subjected to feeding were collected. The degrees of feeding of potato leaves by the larvae at 0 to 24 hours and at 24 to 48 hours were measured, and used as feeding data of "after 24 hours" and "after 48 hours", respectively.

Results are shown in Table 4. In the case of the ethanol-treated E. coli cells containing Hv-iap RNA, a decrease in the fed amount of potato leaves was observed by 24 hours, and a more remarkable decrease in the fed amount was observed after 24 hours. That is, it was revealed that RNA silencing can be sufficiently induced in an objective pest by using ethanol-treated E. coli cells.

TABLE 4

| No. | Experimental group | Hv-iap RNA production | After 24 hours* | After 48 hours* |
|---|---|---|---|---|
| 1 | Control group (only water) | No | ++++ | +++ |
| 2 | Ethanol-treated group; L4440/HT115(DE3) | No | ++++ | ++++ |
| 3 | Ethanol-treated group; pL4440-Pt7-Hviap-Pt7rev/HT115(DE3) | Yes | ++ | + |

*These columns indicate the degrees of feeding of potato leaves by *Henosepilachna vigintioctopunctata* larvae collected after 24 hours and after 48 hours. A larger number of "+" indicates a larger degree of feeding, i.e. a better growth of *Henosepilachna vigintioctopunctata* larvae.

INDUSTRIAL APPLICABILITY

According to the present invention, RNA silencing can be efficiently induced in a target organism.

EXPLANATION OF SEQUENCE LISTING

SEQ ID NOS:
1-14: Primers
15: Nucleotide sequence of Hv-iap
16: Nucleotide sequence of DNA fragment containing F1 promoter
17 Nucleotide sequence of F1 promoter
18-29: Primers
30: Nucleotide sequence of rnc gene of C. glutamicum 2256 (ATCC 13869)
31: Amino acid sequence of Rnc protein of C. glutamicum 2256 (ATCC 13869)
32-41: Primers

The invention claimed is:

1. A method for inducing RNA silencing in a target organism, the method comprising: allowing the target organism to ingest dead cells of a microorganism,
wherein the microorganism is a coryneform bacterium,
wherein the microorganism expresses RNA,
wherein the RNA induces RNA silencing in the target organism,
wherein the dead cells have been subjected to a treatment with an organic solvent,
wherein the dead cells comprise said RNA,
wherein the organic solvent is ethanol or methanol, and the concentration of the organic solvent in the treatment is 30% (v/v) or higher when the organic solvent is ethanol and 50% (v/v) or higher when the organic solvent is methanol.

2. The method according to claim 1, which further comprises preparing said dead cells of the microorganism by subjecting the cells of the microorganism to a treatment before said allowing.

3. The method according to claim 1, wherein the target organism is allowed to ingest the dead cells in an amount of 10 pg-RNA/target organism to 10 μg-RNA/target organism in terms of the amount of the RNA.

4. The method according to claim 1, wherein the treatment is carried out for 1 minute or longer.

5. The method according to claim 1, wherein the microorganism is a bacterium belonging to the genus *Corynebacterium*.

6. The method according to claim 1, wherein the microorganism is *Corynebacterium glutamicum*.

7. The method according to claim 1, wherein the microorganism has been modified so that the activity of ribonuclease III is reduced as compared with a non-modified strain.

8. The method according to claim 1, wherein the target organism is a pest.

* * * * *